United States Patent
Ingles et al.

(10) Patent No.: US 9,842,370 B1
(45) Date of Patent: Dec. 12, 2017

(54) ONLINE BENEFIT UTILIZATION

(71) Applicants: glasses.com Inc., Mason, OH (US); EyeMed Vision Care LLC, Mason, OH (US)

(72) Inventors: Nathanael D. Ingles, Pleasant Grove, UT (US); Casey Joseph Morton, Mason, OH (US); Chris J. Morton, South Jordan, UT (US); Edward R. Nutter, West Chester, OH (US); Darrell L. Price, Salt Lake City, UT (US); Josh W. Searle, Draper, UT (US); Cam V. Vong, Riverton, UT (US)

(73) Assignees: glasses.com Inc., Mason, OH (US); EyeMed Vision Care LLC, Mason, OH (US)

(*) Notice: Subject to any disclaimer, the term of this patent is extended or adjusted under 35 U.S.C. 154(b) by 0 days.

(21) Appl. No.: 15/202,393

(22) Filed: Jul. 5, 2016

Related U.S. Application Data

(60) Provisional application No. 62/189,027, filed on Jul. 6, 2015.

(51) Int. Cl.
*G06Q 40/00* (2012.01)
*G06Q 40/08* (2012.01)
*G06Q 30/06* (2012.01)

(52) U.S. Cl.
CPC ......... *G06Q 40/08* (2013.01); *G06Q 30/0641* (2013.01)

(58) Field of Classification Search
CPC .............................. G06Q 40/08; G06Q 40/00
See application file for complete search history.

(56) References Cited

U.S. PATENT DOCUMENTS

| | | | | |
|---|---|---|---|---|
| 2002/0049617 A1* | 4/2002 | Lencki | ............... | G06Q 30/06 705/4 |
| 2005/0209894 A1* | 9/2005 | Wilson | ............... | G06Q 90/00 705/4 |
| 2011/0022479 A1* | 1/2011 | Henley | ............... | G06F 19/327 705/14.73 |
| 2014/0129259 A1* | 5/2014 | Seriani | ............... | G06F 19/3418 705/3 |
| 2014/0253707 A1* | 9/2014 | Gangadhar | ............... | G02C 13/003 348/77 |
| 2014/0257839 A1* | 9/2014 | Suter | ............... | G06Q 50/22 705/2 |
| 2016/0224752 A1* | 8/2016 | Van Wyck | ............... | G06F 19/3418 |

\* cited by examiner

*Primary Examiner* — Lalita M Hamilton
(74) *Attorney, Agent, or Firm* — Sterne, Kessler, Goldstein & Fox P.L.L.C.

(57) ABSTRACT

A system having an insurance database, a products database, and a benefit utilization processing system is implemented by a system server coupled to the insurance and products databases. The benefit utilization processing system may be configured to retrieve and display eyewear product and pricing information, receive and extract benefit details from a benefits table, and provide specification options compatible with a selected product. The system may then apply the extracted benefit details, associated with the user, to the eyewear product price to determine individual benefit amounts for the selected product and for each selected option or accessory to determine a final benefit amount based on the user's benefit amounts.

21 Claims, 18 Drawing Sheets

ONLINE BENEFIT UTILIZATION

BACKGROUND

It has been reported that millions of Americans, aged 12 years and older, have visual impairment defined as distance visual acuity of 20/50 or worse. Among them, a significant percentage could improve their vision to 20/40 or better with eyeglasses or contacts. Among adults between the ages of 40-64 and 65+ that report having vision difficulties, approximately 58% and 77%, respectively, carry vision insurance.

Vision insurance typically comes in the form of either a vision benefits package or a discount vision plan. Typically, a vision benefits package provides eyewear within fixed dollar amounts and, in some cases, a co-pay each time a service is accessed or provided. A discount vision plan, on the other hand, provides eyewear at discounted rates. In some cases, a vision benefits package or discount vision plan may also include an out-of-pocket deductible before the insurance benefits take effect. Vision insurance can be custom-designed to meet the needs of a wide ranging population, including school districts, unions, and big and small companies. Insurance plans are as diverse as the patient population carrying such plans.

After an eye-exam, a patient carrying vision insurance must typically visit, select, and order his or her eyeglass frames, lenses, or contacts from a brick and mortar store. This inconvenient process must generally be completed in order for a patient to make an insurance claim and utilize any vision insurance benefits. Making an insurance claim and utilizing vision insurance benefits quickly becomes a time consuming process. In addition to traveling to the brick and mortar store, the patient must select the desired eyewear from a limited number of frames displayed on the store's shelves. The patient then requires the assistance of a store employee or doctor to determine whether vision insurance benefits are available, or the type of benefits available, for the selected frame and any potential lenses, coatings, or accessories. This lengthy process is then repeated each time a different pair of eyeglass frames are selected, thereby affecting the patient's buying experience.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Currently, there are a number of e-commerce websites that offer eyewear. But integrating vision insurance within an e-commerce solution provides numerous challenges. Such challenges include: creating a user-specific experience that reaches beyond the scope of a physical retailer; creating a solution that allows the customer to view an estimated price based on his or her own insurance benefits, in real time, thus allowing members to make more educated purchasing decisions before submitting a claim; preemptively addressing questions that a patient may have during the buying process, including itemized charges and claim totals for individual services; and providing sufficient online security to meet HIPAA regulations.

The present disclosure provides solutions for these problems. Provided herein are system, method, and/or computer program product embodiments, and/or combinations and sub-combinations thereof, for providing an enhanced user experience by efficiently accessing and applying insurance benefit data associated with a specific user. Embodiments may also include system, method, and/or computer program products stored in databases across multiple entities including a system server, an eyewear vendor, and an insurance company.

Figure 1:
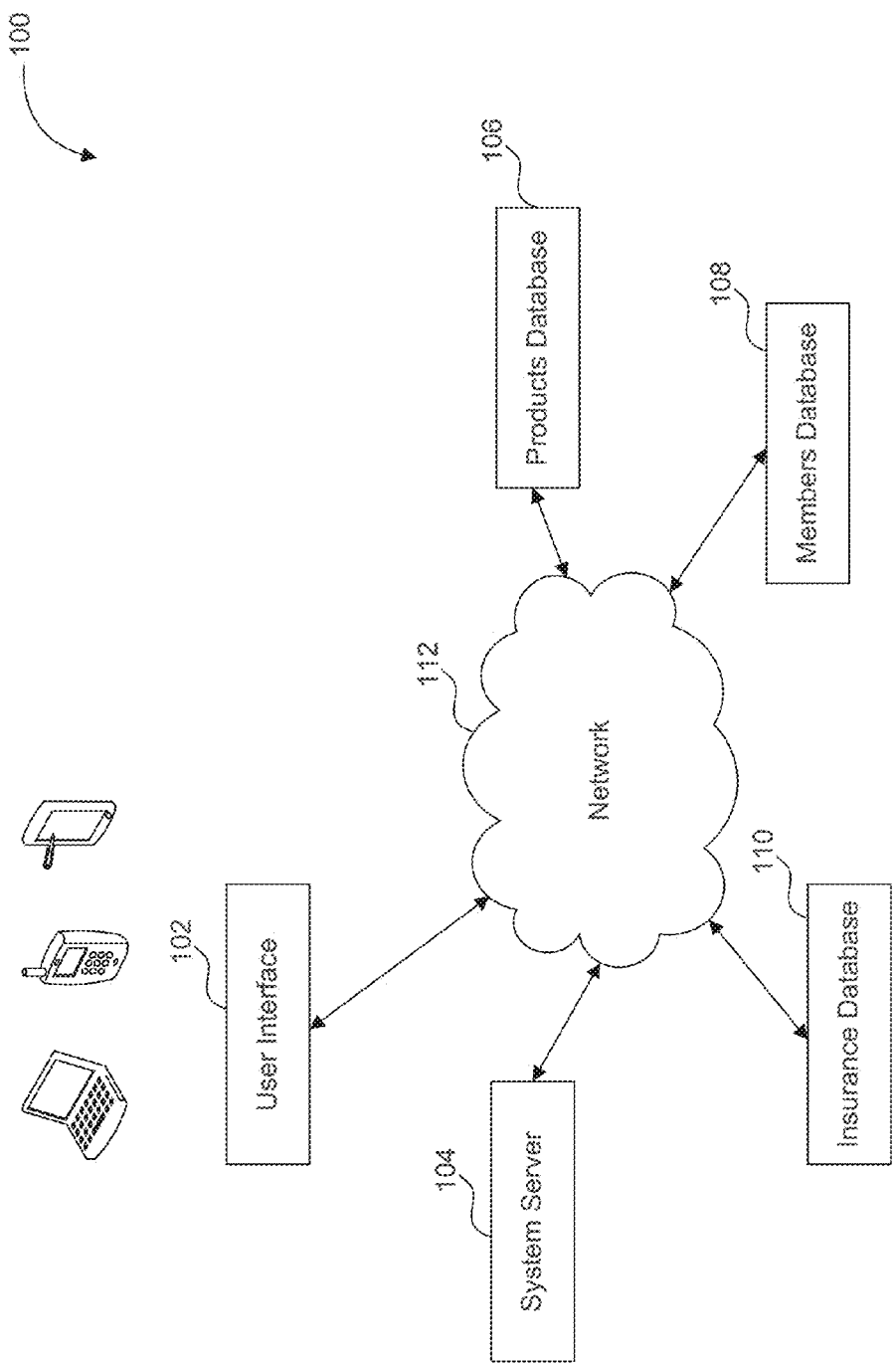
FIG. 1 is an example block diagram illustrating the multiple systems of respective entities involved in providing and maintaining an online insurance benefit utilization system, according to an example embodiment.

FIG. 1 illustrates a linked insurance benefit utilization system 100 for providing and maintaining access to data stored across multiple entities, according to an embodiment. Insurance benefit utilization system 100 includes network 112, user interface 102 operated by an insured user, system server 104, products database 106, members database 108, and insurance database 110. Each of the systems, databases, and/or computers may be implemented using one or more processors and/or one or more data storage locations. Although the systems are depicted as remote systems connected via network 112, one or more systems or databases may be operated by and/or maintained by one entity. For example, system server 104, products database 106, members database 108, and insurance database 110 may be part of a single system operated by one entity. Additional configurations are also contemplated where any one entity may operate one or more of the system server 104, products database 106, members database 108, and insurance database 110. As used herein, an entity may include a processor, server, a network owner, an insurance company, an eyewear provider, a webhost, an individual, or an organization. Additionally, the term "user interface," as used herein, may include any hardware or software with which a human may interact—including a display screen, touchscreen, keyboard, mouse, the appearance of a desktop, illuminated characters, and an application program or website with which a user may interact. The user interface may be a computer, laptop, tablet, smartphone, a mobile computing device, or any other device capable of rendering and displaying an electronic communication.

Network 112 may enable system server 104 to communicate, i.e. send and receive, data among the multiple systems, including: user interface 102, products database 106, members database 108, and insurance database 110. In an embodiment, user interface 102 may communicate with, view, or access product and insurance information stored on any of the entities connected to network 102. Further, network 102 may include the Internet and may therefore be operable to communicate via TCP/IP, HTTP, or any other Internet protocol. Additionally, network 102 may be an enterprise wide area network (WAN) utilizing Ethernet communications, although other wired and/or wireless communication techniques and technologies may be used.

In an embodiment, a computer system may be used to implement aspects of the systems and may be specially programmed to implement aspects of the processes illustrated in FIGS. 2-11. The contemplated computer system may include one or more processors (also called central processing units, or CPUs). The processor may connect to a communication infrastructure or bus.

One or more processors may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, or any other intensive processing needs.

The contemplated computer system may also include user input/output device(s), such as monitors, keyboards, touchscreens, pointing devices, etc., that communicate with communication infrastructure through user input/output interface(s).

The contemplated computer system may also include a main or primary memory, such as random access memory (RAM). The disclosed main memory may include one or more levels of cache and may store therein control logic (i.e., computer software) and/or data.

The contemplated computer system may also include one or more secondary storage devices or memory. The secondary memory may include, for example, a hard disk drive and/or a removable storage device or drive. The removable storage drive may be a floppy disk drive, a magnetic tape drive, a compact disk drive, an optical storage device, tape backup device, and/or any other storage device/drive.

Further, the removable storage drive may interact with a removable storage unit, which includes a computer usable or readable storage device having stored thereon computer software (control logic) and/or data. The contemplated removable storage unit may be a floppy disk, magnetic tape, compact disk, DVD, optical storage disk, and/any other computer data storage device. Accordingly, the removable storage drive may read from and/or write to the removable storage unit in a well-known manner.

According to an example embodiment, a secondary memory may include other means, instrumentalities, or other approaches for allowing computer programs and/or other instructions and/or data to be accessed by the computer system. Such means, instrumentalities, or other approaches may include, for example, a removable storage unit and an interface. Examples of the removable storage unit and the interface may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The contemplated computer system may further include a communication or network interface. The communication interface enables the computer system to communicate and interact with any combination of remote devices, remote networks, remote entities, etc. For example, the communication interface may allow the computer system to communicate with remote devices or databases over a communications path, which may be wired and/or wireless, and which may include any combination of LANs, WANs, the Internet, etc. Control logic and/or data may be transmitted to and from the computer system via the communication path.

In an embodiment, a tangible apparatus or article of manufacture comprising a tangible computer useable or readable medium having control logic (software) stored thereon is also referred to herein as a computer program product or program storage device. This includes, but is not limited to, the computer system, main memory, secondary memory, and removable storage units, as well as tangible articles of manufacture embodying any combination of the foregoing. Such control logic, when executed by one or more data processing devices (such as the computer system), causes such data processing devices to operate as described herein.

Based on the teachings contained in this disclosure, it will be apparent to persons skilled in the relevant art(s) how to make and use embodiments of the present disclosure using data processing devices, computer systems, memory systems, databases, and/or computer architectures. In particular, embodiments may operate with software, hardware, and/or operating system implementations other than those described herein.

Throughout this disclosure various methods are described wherein one or more entities sends/receives electronic data. Some embodiments may describe one entity transmitting data while another entity receives the data. It is also contemplated herein that the receiving entity may also initiate a transaction by polling and/or pulling the necessary data. Thus, the terms transmitting and receiving are not meant to limit the functionality of either entity.

Contemplated herein are processes for providing more accurate pricing and option information to an online user by determining and utilizing insurance benefits for all types of eyewear. As contemplated herein, eyewear products may include any items or accessories worn on or over the eyes, for fashion or adornment, protection against the environment, and to improve or enhance visual acuity. For example, eyewear products may include eyeglasses, frames, contact lenses ("contacts"), sunglasses, safety glasses, or goggles. In some embodiments, the disclosed insurance benefit utilization system may provide a benefit utilization process for eyewear having multiple options or accessories, as depicted and described in FIGS. 2-11. In additional embodiments, the disclosed insurance benefit utilization system may provide a benefit utilization process for eyewear having a single product price, as depicted and described in FIGS. 13-17. In some situations, the disclosed insurance benefit utilization system may determine, dynamically, which type of product the user needs or requires, causing the system to adjust or modify the required benefit utilization process. While one or more exemplary embodiments are disclosed for eyewear products having multiple options or accessories as well as eyewear having a single price, it should be noted that steps and principles may be shared between them. For example, when a step is described for utilizing an insurance benefit for eyewear having a single price, that step is not exclusively limited to products having a single price. Rather, any and all steps may be performed for either type of eyewear product and in any conceivable order or flow, unless explicitly stated to the contrary. Additionally, any and all of these steps may be performed in real-time, such as while the user is browsing through available products. More specifically, as the user/system performs the aforementioned steps, the pricing and options information may be updated to reflect the user's insurance benefit information, in real-time.

Figure 2:
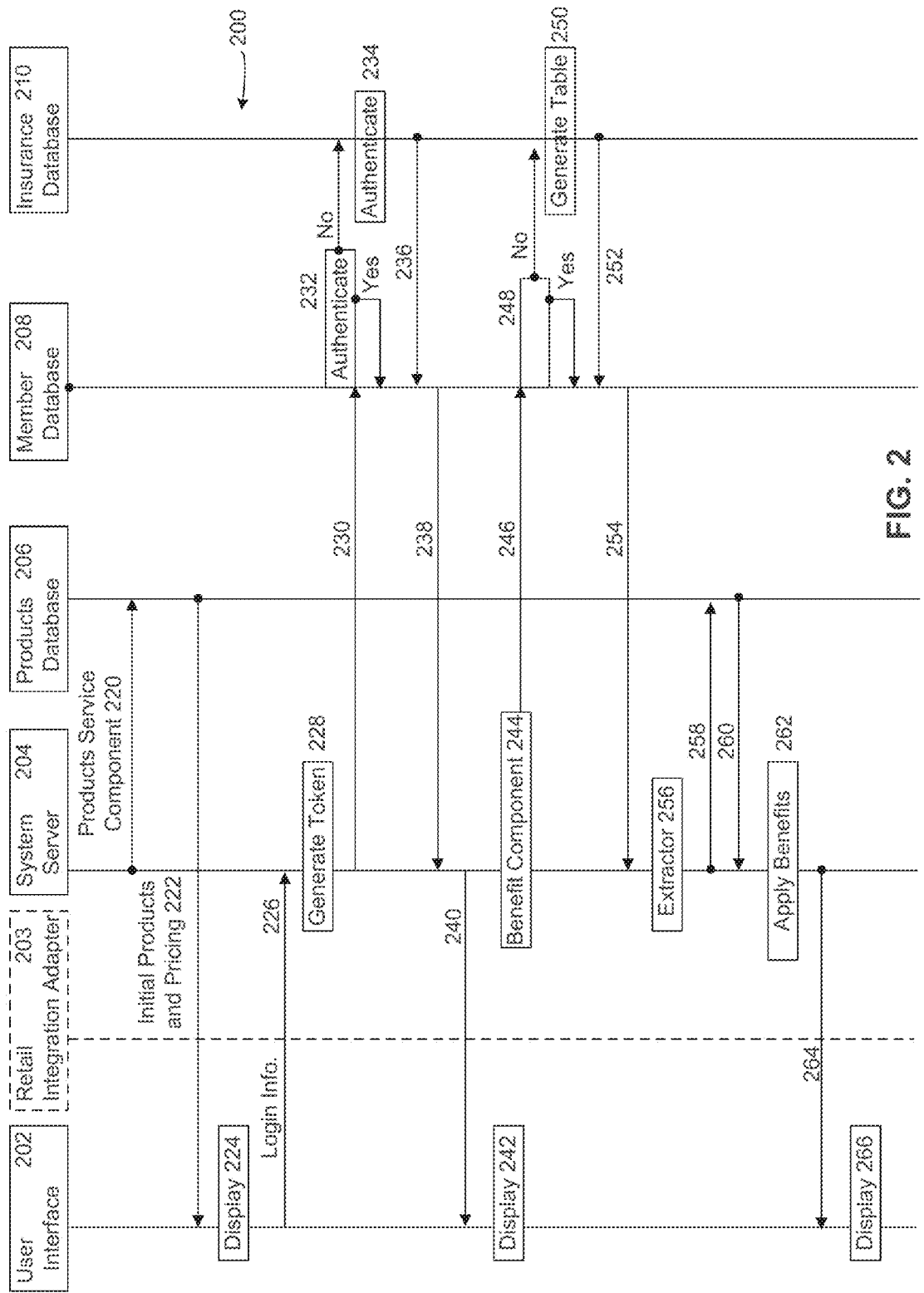
FIG. 2 is a sequence diagram illustrating a process for an online insurance benefit utilization system across multiple systems in order to utilize an initial insurance benefit, according to an example embodiment.

FIG. 2 illustrates an initial insurance benefit utilization process 200 for determining an available insurance benefit and/or claim generally provided as a monetary amount, according to an example embodiment. The multiple systems/databases may include user interface 202, system server 204, products database 206, members database 208, and insurance database 210. Process 200 may be performed by processing logic that may include hardware (e.g., circuitry, dedicated logic, programmable logic, microcode, etc.), software (e.g., instructions executable on the system server, at the user interface, or another processing device), or a combination thereof. It is not required that the steps depicted in FIG. 2 be performed in the exact order shown, as one skilled in the art would understand. In an embodiment, initial insurance benefit utilization process 200 may be adjusted to enable updating information in any one of the databases associated with the user. Additionally, user interface 202 may provide administrative privileges, not shown, wherein a system administrator may access, modify, create, or duplicate the data. A system administrator may also perform other administrative functions in the databases and with the data stored therein, as one skilled in the art would understand.

In step 220, when a user initially accesses a website associated with the insurance benefits utilization system, the products service component of system server 204 sends a products and pricing request to products database 206. At step 222, the products database sends the initial products and pricing information for a variety of eyewear products to the user interface. It is also contemplated that products database 206 may send the initial products and pricing information to system server 204, before, after, or at the same time step 222 is completed. As contemplated herein, eyewear products may include any items or accessories worn on or over the eyes, for fashion or adornment, protection against the environment, and to improve or enhance visual acuity. For example, eyewear products may include eyeglasses, frames, contact lenses, sunglasses, safety glasses, or goggles.

Upon receiving the eyewear product and pricing information, the user interface may, at step 224, render and display the product and pricing information. As depicted in FIGS. 7-11 described below, the user interface may render and display the information on a webpage. In other embodiments the user interface may render and display the information using a web application, a mobile application, or any other means whereby a user may interact with data through an electronic device.

The user may be prompted by the user interface to provide his or her login information. To login, the user must provide a sufficient amount of personal information so the system may associate the user with his or her specific vision insurance plan. Accordingly the system may prompt the user for personal information, including: first and last name, address, date of birth, zip code, portions of his or her social security number (SSN), insurance group identification, insurance member identification, password, and/or any other identifying personal identification. At step 226 the user's login information is transmitted from the user interface to the system server.

Upon receiving the login information, the system server generates a member token at step 228. As used herein, a member token is an identification used within the benefit utilization system to uniquely identify each member. The member token may act as a primary key used within the benefit utilization system, namely within system server 204, member database 208, and insurance database 210 to track and maintain the member's identifying information throughout the data schema.

At step 230, the member token is passed from system server 204 to member database 208 in order to verify and authenticate the user's identity as an insurance member. This step may be completed using a system call to a getEligibility( ) application program interface (API) provided at system server 204.

APIs such as the getEligibility( ) API and other similar APIs disclosed herein, may be developed in order to provide developers an easier and more efficient method for interfacing with external databases and systems. For example, if an insurance provider maintains its database in an AS400 system, the insurance provider may offer one or more external facing APIs to allow external applications to perform a variety of functions necessary for servicing an insurance order or claim.

Figure 4:
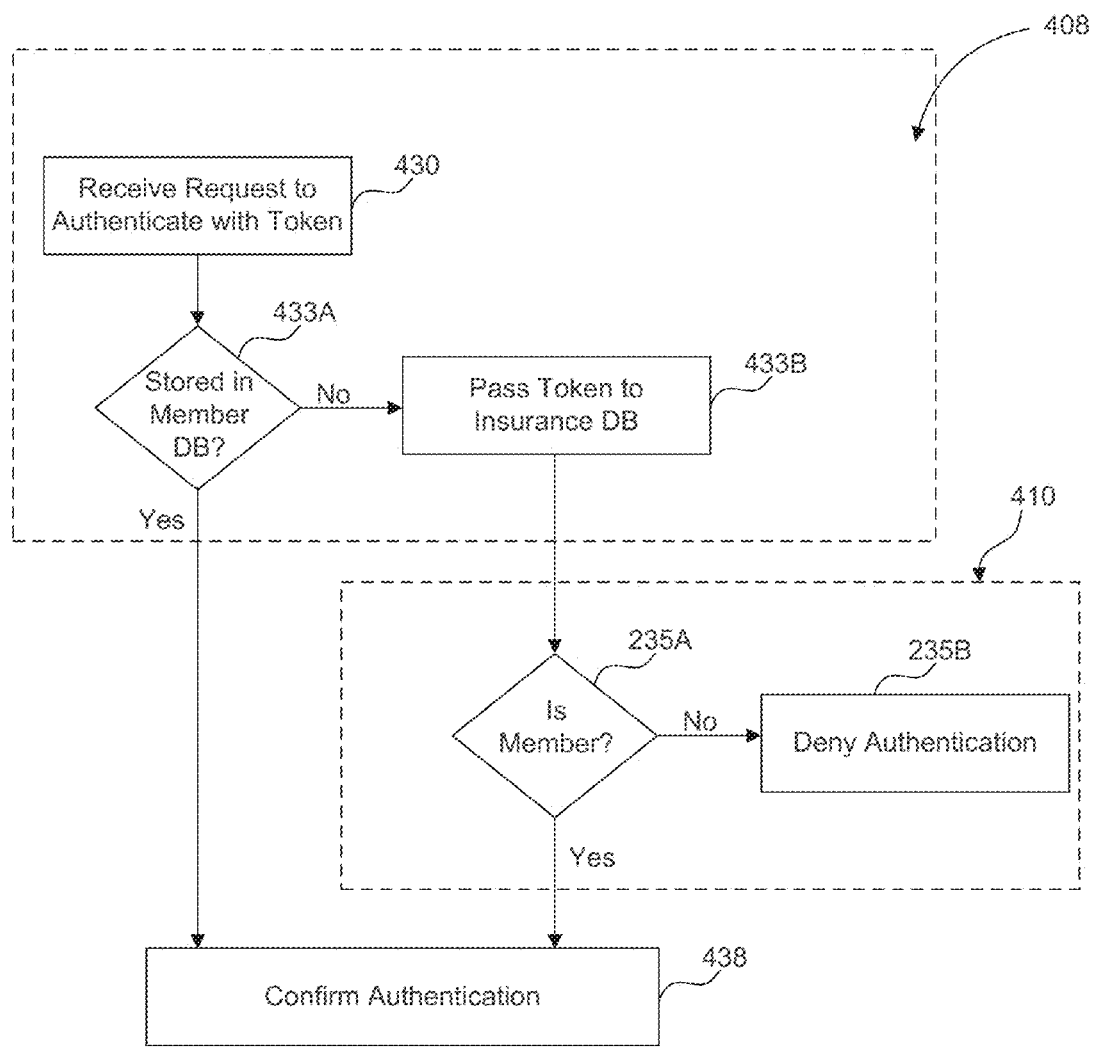
FIG. 4 is a flowchart illustrating steps for online insurance benefit utilization across multiple systems in order to process and authenticate a user's login information, according to an example embodiment.

In steps 232, 234, and as illustrated in FIG. 4, described below, either member database 208 or insurance database 210 may verify and authenticate the user's member token. Steps 236 and 238 depict signals transmitted from the member and insurance databases to indicate that the member token is verified, i.e., that the user is an insured member. If, however, the user provided incorrect or insufficient identification information, the signal passed in steps 236 and 238 will indicate a failed verification and authentication. The verification and authentication result is sent to the user interface at step 204 and the result is rendered and displayed at step 242. If the verification and authentication failed, the user may be provided with additional opportunities to correct or modify the entered login information. Alternatively, the user may be prompted to call or otherwise contact his or her insurance provider to remedy any errors, inconsistencies, or any other deficiencies that may prevent the user from verifying and authenticating his or her insurance membership.

Based on the verified and authenticated member token, the benefit component 244 of system server 204 may request member insurance benefit information from the member and insurance databases, respectively, shown at step 246. As shown, the member insurance benefit information is requested from the respective databases in series. However, the request may alternatively be made in parallel. Further, the benefit component may request the member insurance benefit information exclusively from either the member database or the insurance database. Step 246 may be carried out by making one or more real-time system calls to a getBenefits( ) API.

Steps 248 and 250 retrieve and/or generate a benefits table populated with the user's vision insurance benefit information. In accordance with the present disclosure, a table may be generated according to one of several formats. For example, the table may be an HTML, table, a SQL table, a spreadsheet, a database table, a CSV file, a metadata file, or any other table or file commonly used to distribute categorized data.

At step 254, the benefits table is transmitted from member database 208 to system server 204. Upon receiving the benefits table, extractor 256 parses the data stored within the benefits table and collects specific insurance benefit information. For example, the extractor may collect data such as: an allowance amount, i.e., an amount that may be applied to any qualifying eyewear product; a discount value which is a percentage that may be deducted from the eyewear product price after the allowance amount has been deducted; or any other insurance benefit information specific to the member's insurance policy that may be necessary to determine and process an insurance claim. Additional information may include the date(s) of the user's most recent insurance claims, qualifying eyewear products, qualifying eyewear manufacturers and/or brands, employer-employee incentive program information, or any other user-specific discount information.

Upon parsing and collecting the information, system server 204 may retrieve the pricing information from products database 206 through steps 258 and 260. In some embodiments, the pricing information may have already been sent from products database 206 to system server 204, as described above with respect to step 222. After system server 204 receives the initial products and pricing information, the system server then applies the insurance benefit information to the initial eyewear product and pricing information, as will be described further below. The resulting updated product prices are transmitted to the user interface at step 264, and are rendered at the user interface at display 266. In some embodiments, the updated price may be rendered and displayed on a new webpage or application page in a position next to or near the initial product price, so the user may compare the initial and updated prices. Alternatively, a scripting language may be used to replace the initial price with the updated price without posting back the entire page.

In an embodiment, process 200 may further include one or more retail integration adapters (RIA) 203. In such embodiments, MA 203 may be implemented as a connectivity layer between user interface 202 and system server 204, products database 206, member database 208, and/or insurance database 210. The MA may provide additional point of sale functionality to a front-end user at the user interface. The RIA may additionally, or alternatively, provide functionality on the backend at either the system server, products database, member database, and/or insurance database.

In embodiments where multiple products databases, multiple member databases, and/or multiple insurance databases are being used, an RIA may be implemented to ensure data integrity and/or data security between the databases. In an instance where multiple insurance databases have been implemented, i.e., insurance database X ("IDBX") and insurance database Y ("IDBY"), the RIA will provide access to, and communicate with, either IDBX or IDBY based on the characteristics of user interface 202, the specific user, and/or input received at the user interface. For example, if the user interface is associated with, controlled by, or owned by entity X, the RIA may ensure data integrity and/or data security by facilitating data interactions between entity X users and IDBX and/or other databases associated with entity X. The RIA may additionally block entity X users from accessing IDBY and/or other databases associated with entity Y. In this manner, the RIA controls and facilitates the data interactions between system components. In an embodiment, the RIA will ensure that user interface 202 can only communicate with system servers, products databases, member databases, and insurance databases that it has permission to communicate with. Also, many companies may have their own access or communications protocols for systems wishing to access their data. The RIA may provide a consistent interface between the user interface/front end and databases operating under disparate protocols, storage structures, and/or communications requirements. In other words, the MA translates between the front end and, for example, disparate insurance databases that each have their own storage structure and protocol.

The RIA may be implemented using a plurality of communication protocols based on the specific design characteristics of the system. For example, the MA may be implemented over the Internet and may therefore be operable to communicate via TCP/IP, HTTP, or any other Internet protocol. Additionally, the RIA may be implemented on an enterprise wide area network (WAN) utilizing Ethernet communications, although other wired and/or wireless communication techniques and technologies may be used.

Figure 3:
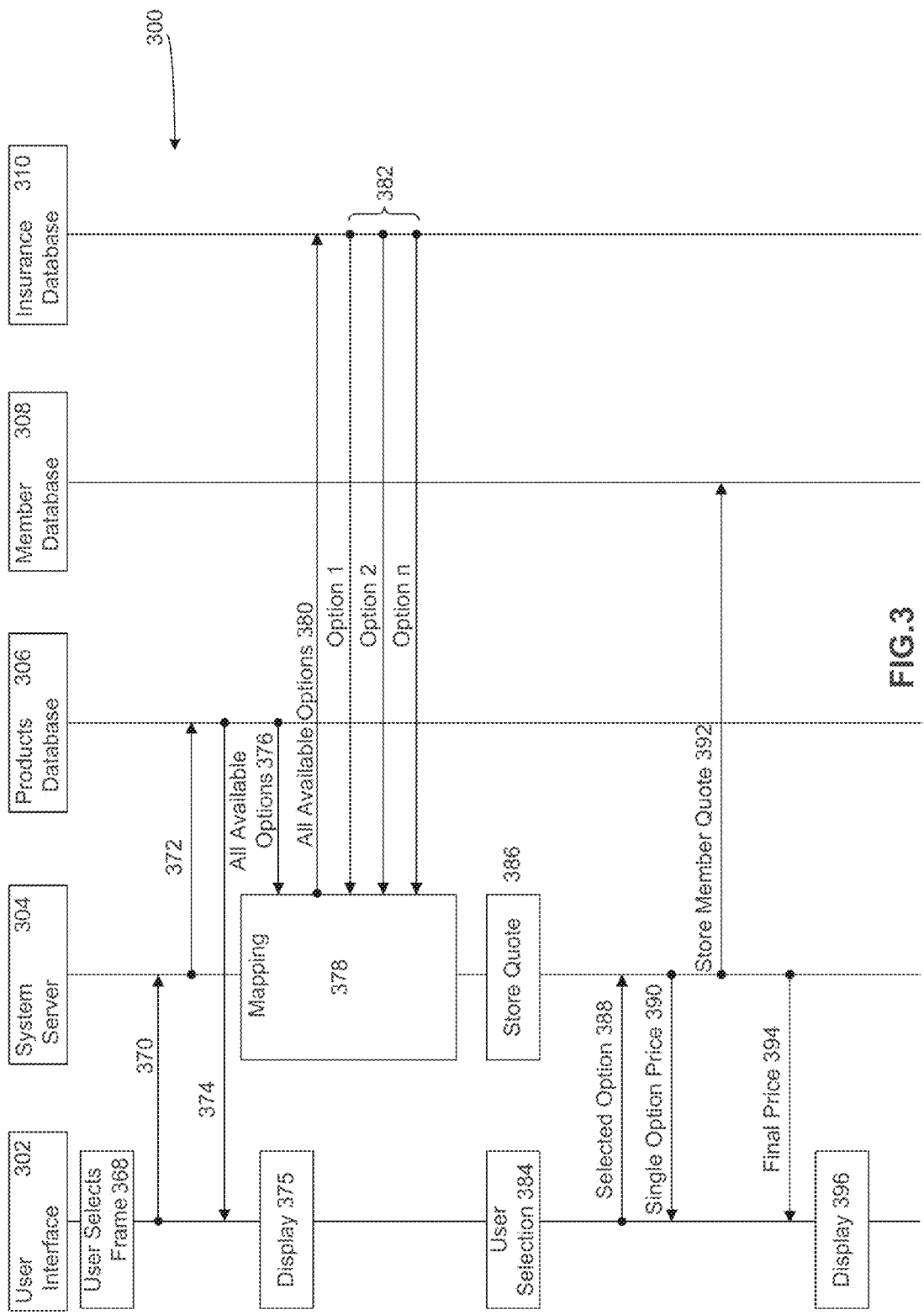
FIG. 3 is a sequence diagram illustrating a process for an online insurance benefit utilization system in order to utilize insurance benefits for additional options and accessories, according to an example embodiment.

FIG. 3 illustrates an eyewear options insurance benefit utilization process 300 for determining an insurance benefit and/or claim as it relates to various eyewear options and accessories corresponding to a user-selected eyewear product, according to an example embodiment. The multiple systems/databases may include user interface 302, system server 304, products database 306, members database 308, and insurance database 310. Eyewear options insurance benefit utilization process 300 may be performed by processing logic that may include hardware (e.g., circuitry, dedicated logic, programmable logic, microcode, etc.), software (e.g., instructions executable on the system server, at the user interface, or another processing device), or a combination thereof. The steps in FIG. 3 need not be performed in the exact order shown, as one skilled in the art would understand. Process 300 may be adjusted to enable updating information in any one of the databases associated with the user. Additionally, user interface 302 may provide administrative privileges wherein a system administrator may access, modify, create, and/or duplicate data. The administrator may also perform other administrative functions in the databases and with the data stored therein. As depicted in FIG. 3, the system comprises the same entities illustrated in FIG. 2 and described above. It is contemplated herein that the eyewear options insurance benefit utilization process 300 may use the same or different processors and databases than those of the system illustrated in FIG. 2. Additionally, processors and databases may be operated by the same or different entities, as/than those illustrated in FIG. 2. Process 300 may further include an RIA. In process 300, the RIA may be implemented as a connectivity layer between user interface 302 and system server 304, products database 306, member database 308, and/or insurance database 310, thereby facilitating data communications between the system components using the functionality described above.

It is known in the art that there are hundreds, if not thousands, of different eye and vision conditions, disorders, and diseases. Each condition may present a number of problems and an even larger number of solutions. Various forms of eyewear have been developed to help correct many of the eye and vision conditions. In order to meet the needs of its members, insurance companies have ranges of benefits for each eyewear solution, thereby presenting a challenge for software developers to provide a system capable of providing real-time benefits analysis and real-time discounts based on each user's individual insurance plan.

Eyewear options insurance benefit utilization process 300 determines insurance benefits in real-time, while the user mixes and matches compatible options and accessories for the selected eyewear. For example, at step 368 the user may interact with user interface 302 to select a pair of eyeglass frames from a previously provided list of eyewear products. That list may have included user-specific prices based on the user's insurance benefits, as described with respect to FIG. 2. User specific prices may be calculated by subtracting the user's allowance and any additional discounts from the original retail price of a selected product. The remaining amount is the user-specific price, or the price that the user will have to pay for the product after the user's vision insurance benefits have been applied (also referred to as the "out-of-pocket" price). At step 370, the user's selection is transmitted to system server 304 and then to products database at step 372. Based on the user's selection, products database 306 provides additional eyewear specifications at user interface 302, which renders and displays the compatible options at display 375. As mentioned above, in some embodiments the display may include a webpage, a web application, a mobile app, or another means by which a user may interact with the eyewear product information. Additional eyewear specifications include product size, weight, color(s), lens shape, style, manufacturer, accessories, user reviews, or other information that may assist the user's decision making process. Also included at step 374 and rendered in display 375 are any available options compatible with the selected eyewear. Compatible options include lens types, such as single vision, bi-focal, tri-focal, or progressive lenses; lens shapes, including round, square, oval, etc.; lens materials such as CR-39, polycarbonate, or high-index materials; lens coatings, including anti-reflection, anti-glare, or anti-smudge coatings; lens transitions; and more.

At step 376, the products database provides the available options to pre-processing mapping layer 378 of the system server.

As mentioned above, insurance companies maintain ranges of benefits for the vast number of eyewear solutions. As a result, insurance companies generally maintain complex databases populated with identification numbers compatible with their respective data schema. Likewise eyewear providers generally maintain their own databases using their own identification numbers, also known as stock keeping units (SKUs), in a format that is compatible with their respective data schema. Because the identification numbers used by the insurance company to identify an eyewear product/solution are often different than those of an eyewear provider, the respective identification numbers must be normalized.

The eyewear options insurance benefit utilization process 300 provides a normalization process at pre-processing mapping layer 378. Upon receiving the available options from the products database, the pre-processing mapping layer translates and normalizes the eyewear provider's product ID, SKU numbers, and product information, then maps the translated/normalized information to the corresponding ID, SKU, and information in the insurance database.

When a user is exploring the various options for his or her lenses, it can be time-consuming and inefficient for the system to make individual pricing calls only when a particular option is selected. Embodiments of the present invention overcome this inefficiency by pre-populating that information in the system, such that it can automatically be incorporated into the price—in real time and without delay—as a user explores and selects various combinations of options. As shown at step 380, the pre-processing mapping layer makes one call to the insurance database, including the translated, normalized, and mapped identification numbers therein. Step 380 may be carried out by making one or more real-time system calls to a getPricing( ) API, for each possible option compatible with the specifications and frame selection chosen by the user. In response to the pre-processing mapping layer call, insurance database 310 provides benefit and pricing information for each of the compatible options 1-n in batch form, at step 382. The compatible options include a plurality of alternative options, such as whether or not a particular coating is applied, or a variety of different coatings. At step 386, upon receiving the benefit and pricing information for each of the compatible options, system server 304 creates and stores a data file or quote containing the retrieved pricing information. Accordingly, when the user selects one of the displayed available options at step 384, user interface 302 transmits the selected option to the system server at step 388. Using the stored quote, the system server may quickly and efficiently respond by transmitting the pricing information for the user selected option at step 390. In order to provide more efficient quote information, at step 392, the system server may cache, or store, the quoted pricing information in the user database along with the associated member token. Storing the quoted pricing information in member database 308 for all potential options provides a more efficient method for retrieving benefit pricing information.

At step 394, the system server applies the final benefit amount to the price of the selected eyewear. As used herein, the final benefit amount is calculated based upon the user selected options combined with the allowances and discounts described above. For example, the final benefit amount may be calculated by subtracting the user's allowance and additional discounts from the original retail price of a selected product. Any additional discounts, including discounts for selected options compatible with the selected eyewear as mentioned above, may also be subtracted from the original retail price. The remaining amount is an out-of-pocket price, or the price that the user will have to pay for the product and the selected components after the user's vision insurance benefits have been applied. The resulting final out-of-pocket price is rendered and displayed at the user interface at display 396.

As mentioned above, verifying and authenticating a member token associated with a user is one of the first steps in the disclosed insurance benefit utilization system. Generally, when interacting with an ecommerce website, a username, password, and other basic account information is maintained by the ecommerce provider. However, in 1996, U.S. Congress passed the Health Insurance Portability and Accountability Act of 1996 (HIPAA). The HIPAA Privacy Rule provides federal protections for individually identifiable health information held by covered entities and their business associates and gives patients an array of rights with respect to that information. At the same time, the Privacy Rule is balanced so that it permits the disclosure of health information needed for patient care and other important purposes. The Security Rule specifies a series of administrative, physical, and technical safeguards for covered entities and their business associates to use to assure the confidentiality, integrity, and availability of electronic protected health information. Accordingly, vision insurance providers are required by law to safeguard the health information of its insured members, only permitting a limited disclosure of health information needed for patient care. As provided by the disclosed insurance benefit utilization system, the system server may retrieve a limited amount of health information associated with a member token directly from the insurance database. However, requiring a direct link to the insurance database presents a significant problem.

As is known in the art, insurance database systems generally shut down at night for claim processing and database maintenance. Yet, most e-commerce shoppers do their online shopping at night during non-working hours. Thus, when the disclosed insurance benefit utilization system encounters its peak web traffic, and when it needs a direct link to the insurance database the most, the insurance platform/database may be down for claim processing and maintenance. In order to overcome this obstacle, the disclosed insurance benefit utilization system further includes a member database wherein member information may be cached or stored outside the insurance platform/database, and wherein the storage remains compliant with HIPAA regulations. For example, the current disclosure provides a HIPAA compliant storage solution whereby the system server caches, or stores, the quoted pricing information in the user database along with the associated member token.

The member database may store a member token, quoted pricing information, and a limited amount of health information so as to remain compliant with the HIPAA regulations. Additionally, the system may further provide an encoder, a decoder, an encryptor, and a decryptor in order to encode/decode and encrypt/decrypt, respectively, and thereby add another layer of security using conventional security methods. In an exemplary embodiment, the member database functions similar to a first-in-first-out (FIFO) queue, wherein the oldest data, or 'head' of the queue, is removed from the queue when the member database has reached its capacity. For example, consider an embodiment where the member database may store information for a maximum number of users, for example 1,000 users. When the member database is already at capacity and another entry is added to the database, the oldest entry is removed. Examples for how the system accounts for the first-in-first-out nature of the member database are provided in FIGS. 4 and 5. Additional steps may be taken to ensure data security such as providing an account time-out after a certain period of time, wherein the user may be prompted to again provide his or her login information. It is also contemplated that the system can save the information for an unlimited number of customers without requiring a limiting queue process. For example, if a user owns a membership to an online eyewear provider and has vision insurance through a third party insurance provider, it is contemplated that the eyewear provider may sync and store information for each of membership information, personal information, and insurance information, providing a more efficient process without encountering service disruptions caused by the insurance database shutting down for claim processing and database maintenance.

FIG. 4 provides an exemplary method for verifying or authenticating a user based on a member token previously generated by the system server. At step 430, member database 408 receives a request to authenticate a member token. At step 433A, the database determines whether or not the member token is stored thereon. If the received member token matches that of a cached entry, the member is authenticated at step 438 and additional processing is avoided. If, however, the received member token does not match that of a cached entry, at step 433B the token is transmitted from the member database to insurance database 410. At step 235A, the insurance database determines whether the member token matches that of an insured member. If not, the authentication is denied at step 235B. If the member token does match that of an insured member, the authentication is confirmed at step 438 and the disclosed insurance benefit utilization system proceeds to the next step.

Figure 5:
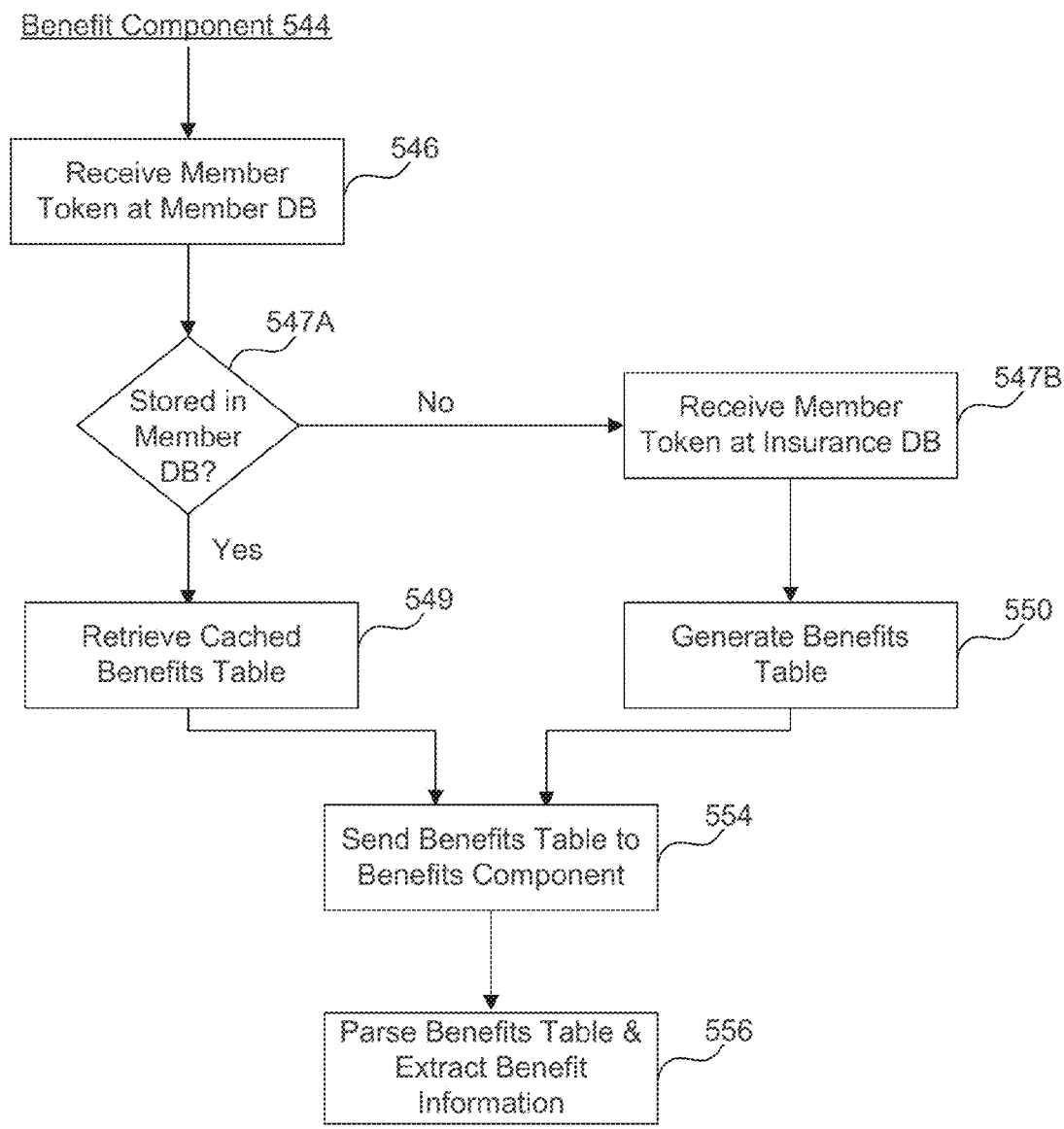
FIG. 5 is a flowchart illustrating steps for online insurance benefit utilization across multiple systems in order to obtain or generate a benefits table, according to an example embodiment.

FIG. 5 illustrates an exemplary embodiment for retrieving/obtaining the benefits table introduced above. At step 544, the benefit component of the system server transmits a request to the member database with an accompanying member token. At step 546, the member database receives the request and at step 547A determines whether the requested benefits table is stored within the member database. If the member token matches that of a cached entry, the benefits table is retrieved at step 549 and is transmitted to the benefits component at step 554. Upon receiving the benefits table, the system server's extractor may be configured to parse the information stored within the benefits table and extract the information, values, and insurance benefits relevant to the disclosed insurance benefit utilization system, as shown at step 556 and as discussed above. If, at step 547A, it is found that the member token does not match that of a cached entry, the member token and request for a benefits table is transmitted from the member database and received by the insurance database. Upon receiving the member token and request for a benefits table associated therewith, the insurance database may generate a benefits table populated with the vision insurance benefit information associated with the member token. The generated benefits table is then transmitted to the benefits component at step 554 where the extractor may be configured to parse and extract the information, values, and insurance benefits relevant to the disclosed insurance benefit utilization system as discussed above.

As illustrated in FIG. 5, the request for a benefit table is completed among the member and insurance databases in series. However, it is also contemplated that the request may be made in parallel. Further, based on the data schema of the system, the benefit component may request the benefits table exclusively from either the member database or the insurance database, respectively. In an embodiment, the member token and request for benefit information may be carried out by making one or more real-time system calls to a getBenefits( ) API.

Figure 6:
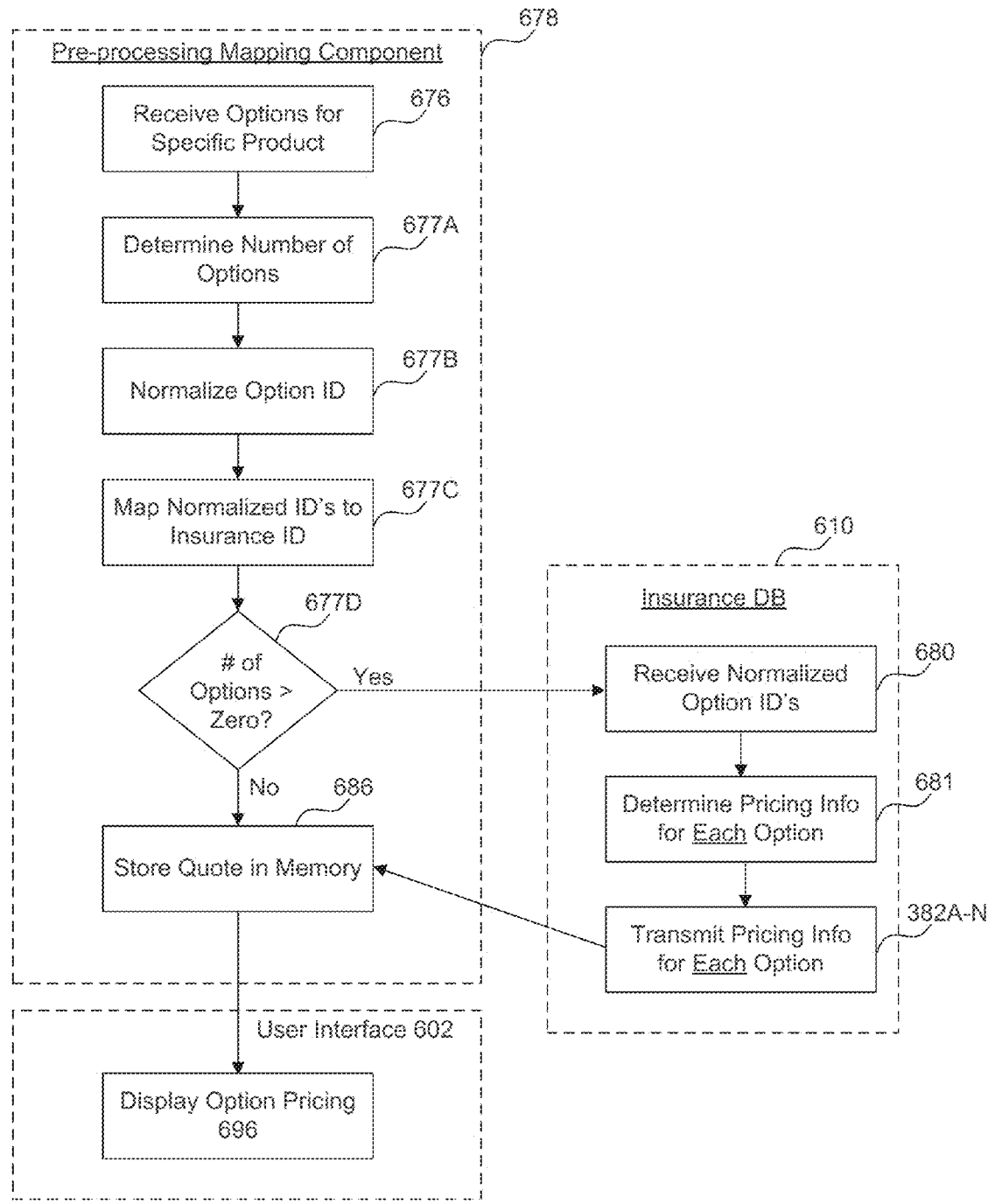
FIG. 6 is a flowchart illustrating steps for online insurance benefit utilization across multiple systems in order to normalize product identification numbers and map the normalized identification numbers to that of an insurance database, according to an example embodiment.

With limited guidance regarding out-of-pocket expenses, a customer visiting a brick-and-mortar store must also select prescription type, lens options, and additional upgrades without understanding how the user-specific insurance benefits will be applied to his or her order. FIG. 6 provides a step-by-step description of an exemplary embodiment for retrieving pricing information for compatible options for a selected eyewear product, so that the e-commerce user can see the effects of such selections in real-time. Such an embodiment may be used for steps 376, 380, 382, and 386 as described above with respect to FIG. 3. As mentioned above, because the identification numbers used by the insurance company to identify an eyewear product/solution are often different than those of an eyewear provider, the respective identification numbers must be normalized. In an embodiment, pre-processing mapping layer 678 performs this normalization process. At step 676, the pre-processing mapping layer receives the options that are compatible with a particular eyewear product. Upon receiving the options, the pre-processing mapping layer determines the number of compatible options at step 677A, normalizes the option IDs or SKUs at step 677B, and maps them to corresponding IDs or SKUs found in the insurance database at step 677C. If the number of compatible options is equal to zero, as determined at step 677D, the pre-processing mapping component creates and stores, at step 686, a data file or quote containing any retrieved pricing information, such as a user's insurance allowance or other discount information. If step 677D reveals that the number of compatible options is greater than zero, pre-processing mapping layer 678 makes one call to insurance database 610, wherein the call includes the translated, normalized, and mapped identification numbers as depicted at step 680. Upon receiving the normalized compatible option IDs or SKUs, the insurance database determines the pricing information for each option based on the user's specific insurance benefit information, as per step 681. The insurance database may then transmit the pricing information for each compatible option individually, at steps 382A-N. It is also contemplated that the pricing information for each compatible option may be transmitted in a single batch, where the pre-processing mapping layer or system server may then parse the received batch and store the pricing information, or quote, in memory in step 686. The retrieved compatible option pricing information may be rendered and displayed at user interface 602 in step 696.

As disclosed herein, the user interface may render and display the information in the form of a webpage, while in other embodiments the user interface may render and display the information using a web application, a mobile application, or any other means whereby a user may interact with data through an electronic device. The rendered display may prompt users for information in the form of a pop-up window, a text box, text input boxes, or graphical user interfaces (GUI) that may be selected/manipulated using a pointer, mouse, or touchscreen. Additionally, the user may interact with the rendered display through radio buttons, check boxes, or by selecting an image. The rendering and displaying of user-specific pricing information may be performed, for example, through dynamic HTML coding referencing the retrieved pricing information, as would be understood by a person of skill in the art.

Figure 7:
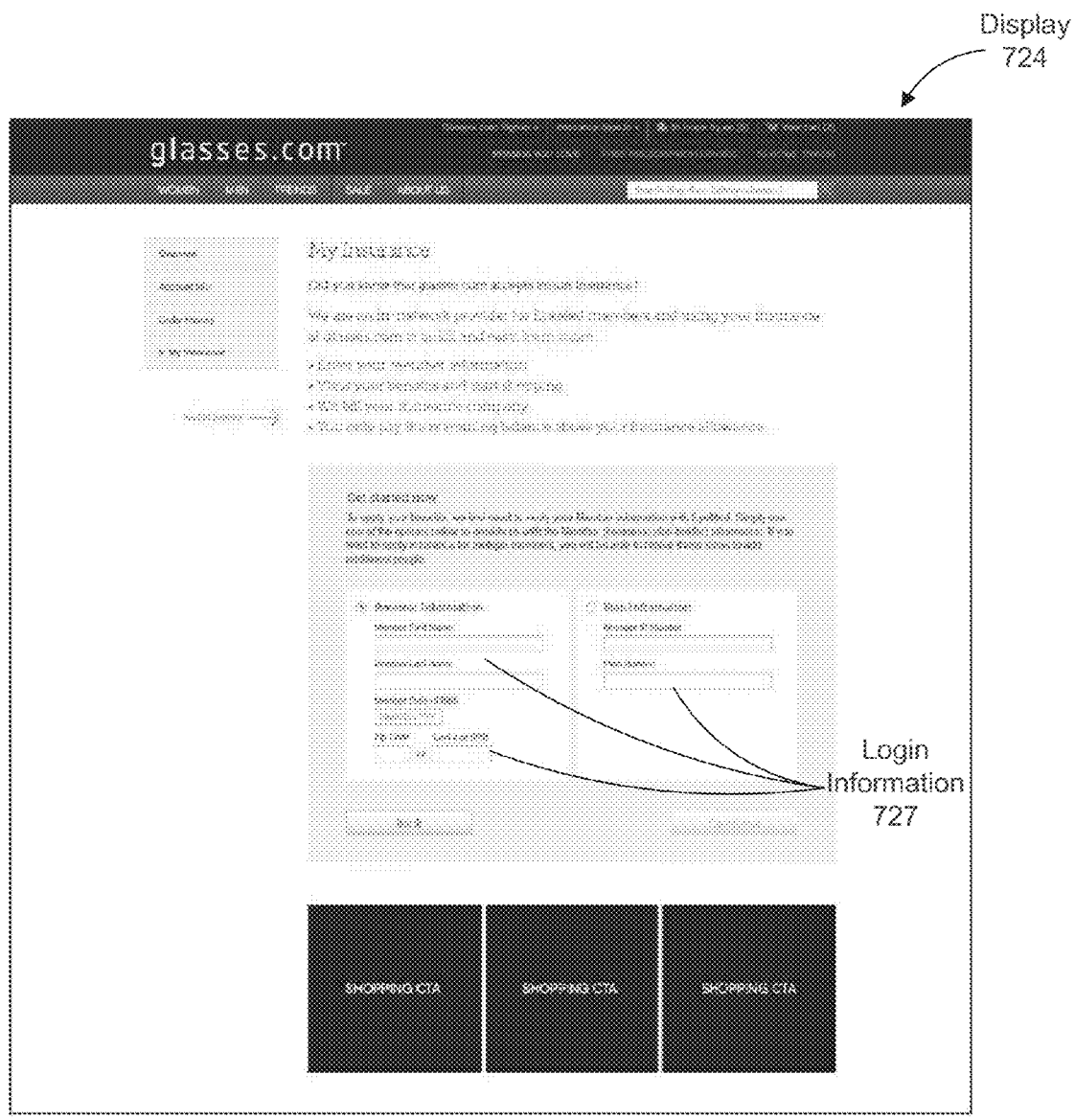
FIGS. 7-11 illustrate example implementations of webpages for an insurance benefit utilization system, according to example embodiments.

FIG. 7 illustrates an example implementation and display 724 of a webpage for an insurance benefit utilization system. More specifically, FIG. 7 provides an example of a login page where the user is prompted to provide the requisite login information 727, so that the system server may generate a member token and begin the verification and authentication process described above. As shown, the user may either A) enter personal information such a first name, last name, date of birth, and either the member's zip code or the last four digits of the member's SSN, or B) enter plan information such as the member ID number and the plan number.

Figure 8:
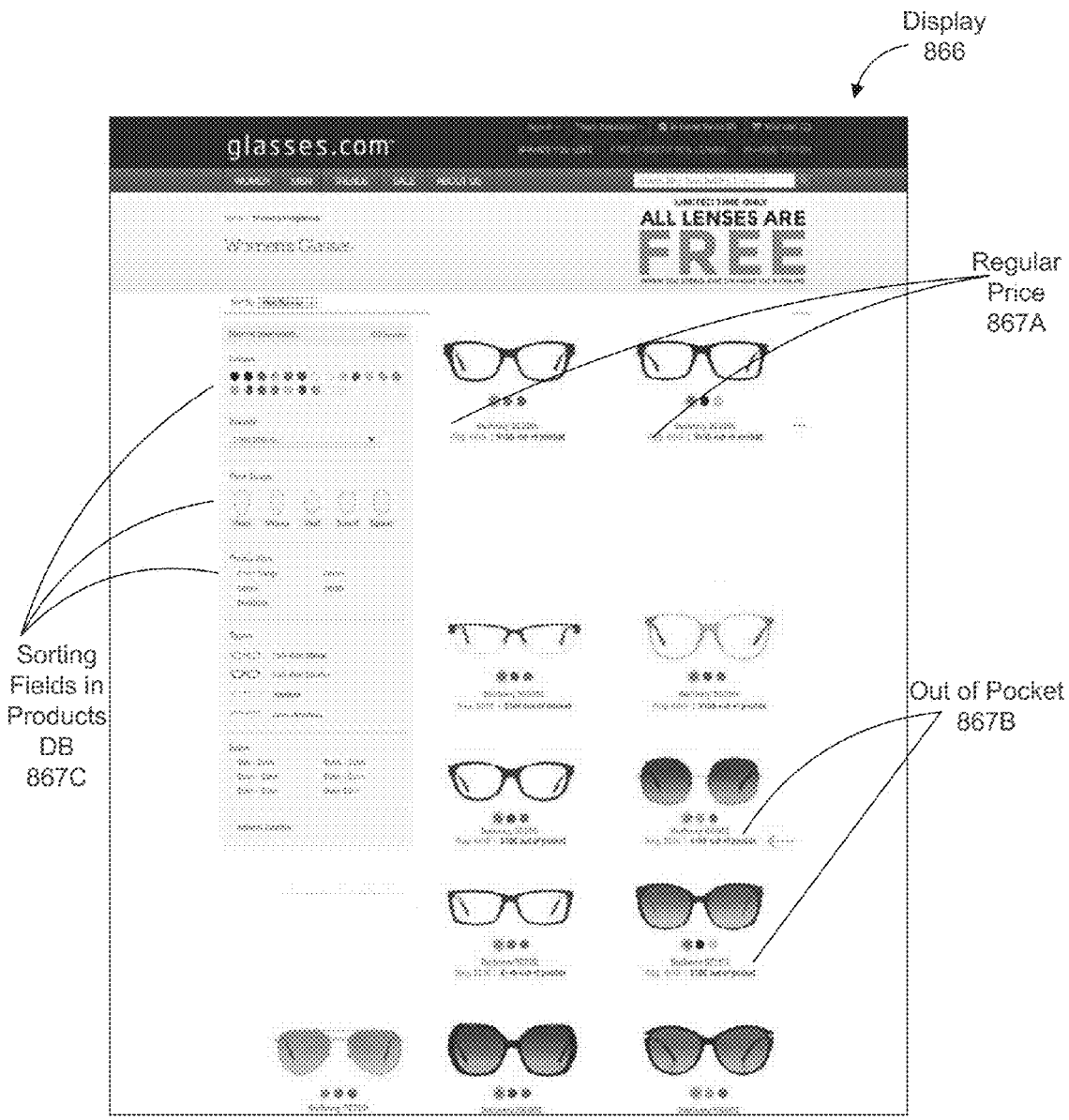

FIG. 8 illustrates an example implementation and display 866 of a webpage providing both an original regular price for the eyewear product 867A and the calculated out-of-pocket price 867B. In this case eyewear product 867A is an eyeglass frame. Out-of-pocket price 867B has been determined by applying a user's insurance benefit information to the original regular prices for the eyewear using the methods described above. Also shown are methods for enhancing the user's shopping experience, wherein the user may sort the displayed eyewear by color, brand, shape, size, type, price, rating, or any other specification or measureable metric commonly used to discern between various types of eyewear.

Figure 9:
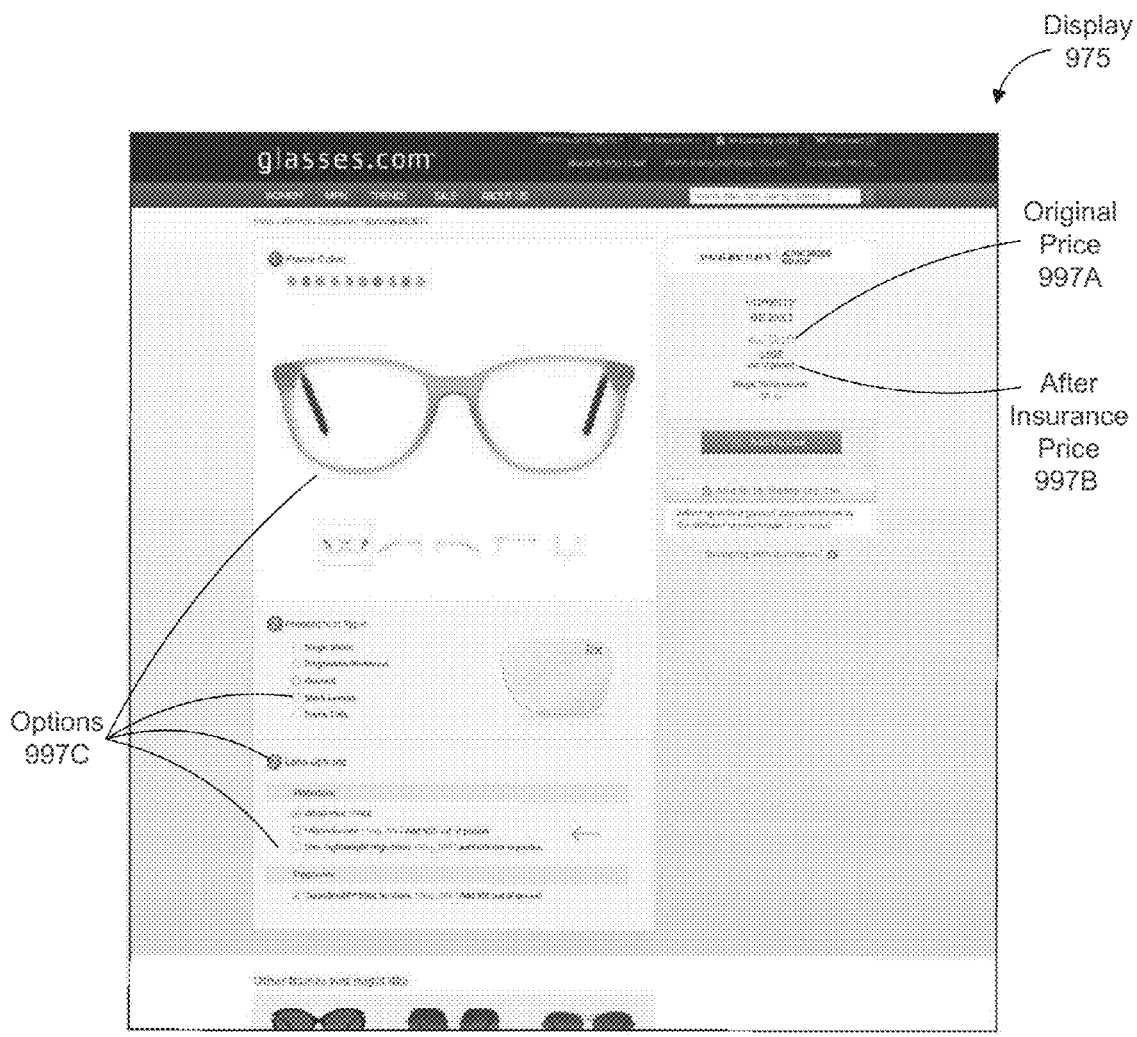

FIG. 9 illustrates an example implementation and display 975 of a webpage providing a product display page. As shown, the page includes the original regular price for the eyewear product 997A and the calculated after-insurance price 997B. Additionally depicted are examples of compatible options 997C that may be selected in order to complete the eyewear purchase. In this embodiment, frame color, prescription type, lens options, and additional upgrades are compatible with the selected eyeglass frames. As a user makes different selections, after-insurance price 997B is calculated based on information obtained from the methods described with respect to FIGS. 3 and 6. Additional information may be displayed next to each option to let the user know how a particular selection will affect his or her total out-of-pocket price (e.g., "Add $29 out of pocket").

Figure 10:
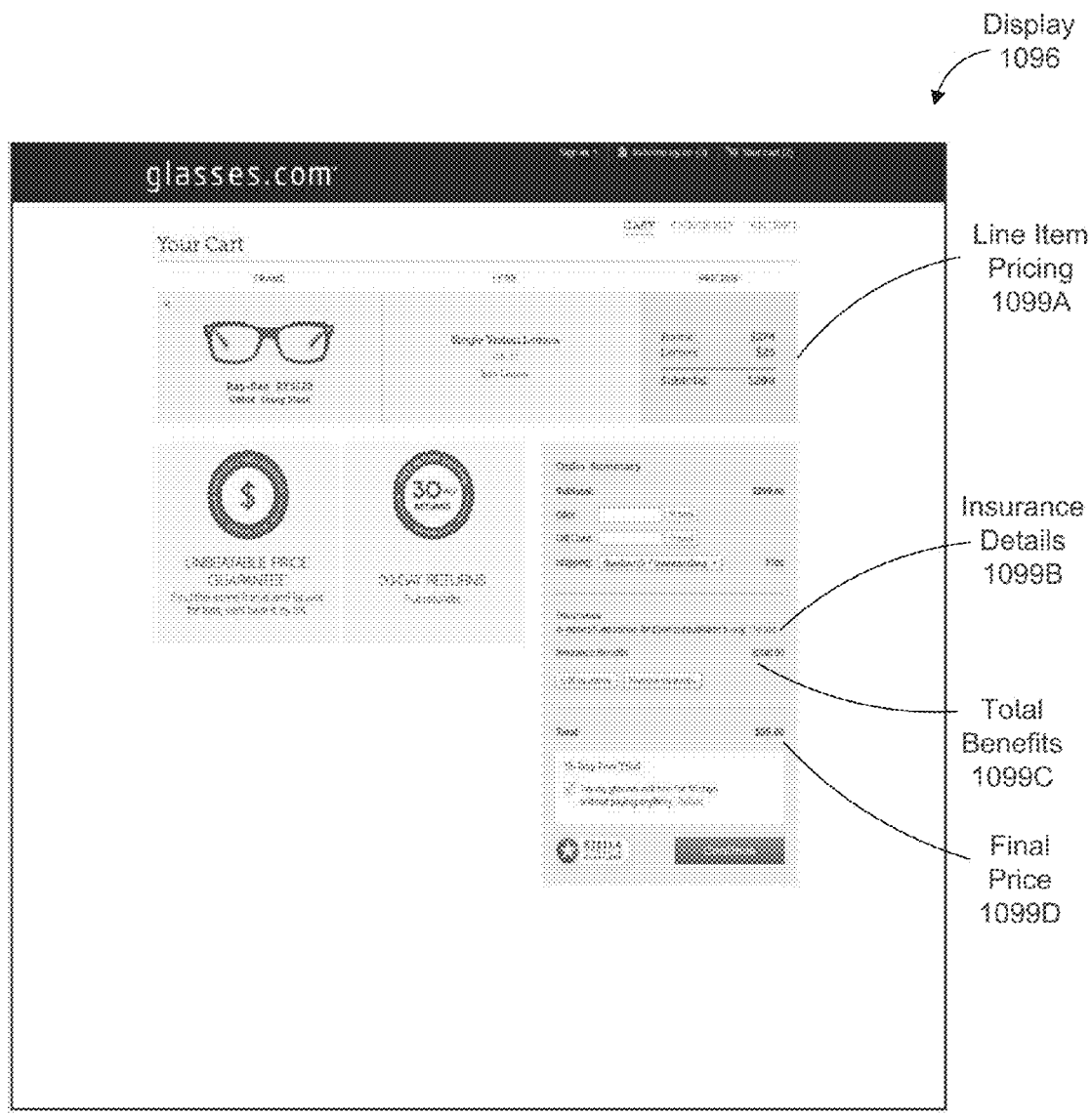

FIG. 10 illustrates an example implementation and display 1096 of a webpage providing a shopping cart view, including detailed selection and pricing information. When a customer visits a brick and mortar eyewear store, he or she must select the frames they desire. With limited guidance regarding his or her out-of-pocket expenses, the customer must also select prescription type, lens options, and additional upgrades without understanding how his or her insurance benefits will be applied to the order. As shown in display 1096, the disclosed insurance benefit utilization system may be configured to provide line item pricing 1099A, insurance details 1099B, and total benefits 1099C, wherein the user may see detailed information about how his or her vision insurance has been applied to the purchase. By providing line item pricing, the user may make more informed purchase decisions and may be provided with final price 1099D based on the summation of total benefits.

Figure 11:
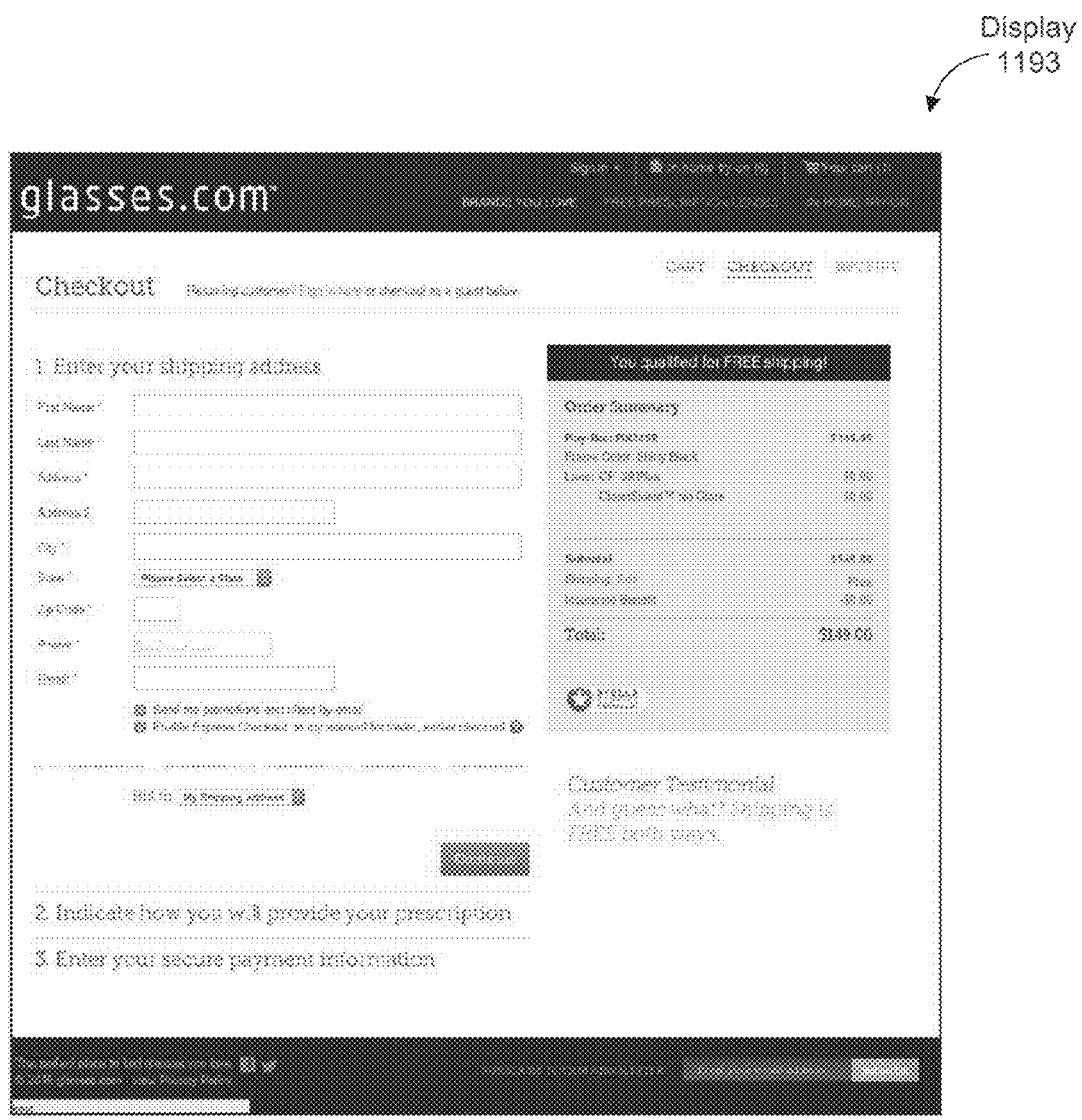

FIG. 11 illustrates an example implementation and display 1193 of a webpage prompting a user to input shipping information, review the order summary, and confirm his or her purchase.

After an order is placed, payment authorization begins and the eyewear provider may utilize an insurance provider's claim authorization API to claim a user's benefits. As such, if at any point in time an order is cancelled prior to shipping the ordered product, the eyewear provider may void the claim authorization and return the benefits and eligibility back to the user.

Following the user's payment and claim authorization, the user's eyewear order is processed by eyewear provider's order management system and communicated with the systems, applications, and products (SAP) management. The user's order is processed and fulfilled by the eyewear provider's distribution chain and shipped to the customer within a specified period of time. Once shipped, the order management system triggers the eyewear provider's insurance service to create a claim on behalf of the member. In an embodiment, the member's claim is generated within the eyewear provider's insurance service and sent via API to the insurance provider's claim service. The claim is received and processed through the insurance provider's system.

Processing a user's claim may take a predetermined length of time, at which point claim updates may provided via a digital 835 EDI file placed on the eyewear provider's server, according to an embodiment. The insurance provider's insurance service may retrieve these 835 EDI documents, parse pertinent information, and update claims within the eyewear provider's insurance service. Orders associated with these claims may be simultaneously updated to reflect status changes to the claim.

Figure 12:
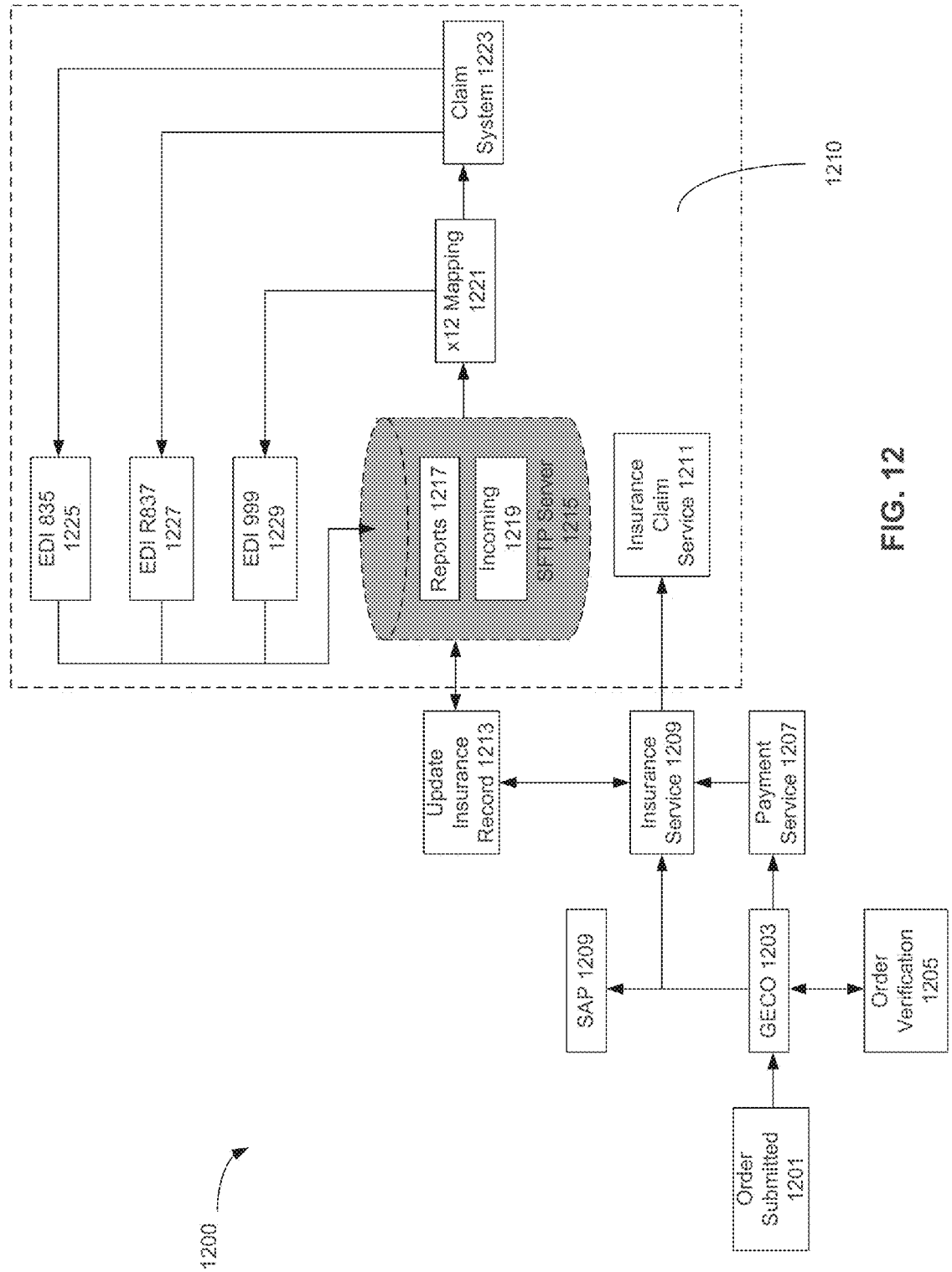
FIG. 12 is an example block diagram illustrating a process for submitting, tracking, and utilizing an insurance benefit claim, according to an example embodiment.

FIG. 12 illustrates an example process for submitting, tracking, and utilizing an insurance benefit claim 1200. At step 1201, when the user submits his or her eyewear order, the insurance database provides a membership authorization and locks the member's benefits so that the user cannot make a duplicate insurance claim at another location or with another eyewear provider. Order and checkout information is received at the eyewear provider's management system, GECO 1203. The GECO management system then provides checkout and user information to an order verification portal 1205, payment service 107, systems, applications, and products system (SAP) 1209, and insurance service 1209. At verification portal 1205, the order information and method of payment are verified. SAP system 1209 receives information being sent from the GECO management system, including discounts, reimbursements, and product details. Additionally, GECO management system 1203 sends queue information to insurance service 1209, to inform the insurance service that an insurance order has been received through the eyewear provider. Further, after the ordered eyewear product has been made, assembled, and shipped to the user, the GECO management system transmits information to payment service 1207 to charge the order, which communicates to insurance service 1209 that the order has been charged and that the claim process should begin. When the insurance service has been notified that the order has been charged, it creates an insurance claim through a claim API, which engages with insurance claim service 1211 of insurance database 1210.

At insurance database 1210, reports may be transmitted to, entered, or uploaded to server 1215. Over the course of the claim submission process, the reports may be updated with claim status information as it becomes available. Within a predetermined period of time, the claim system processes EDI 835 document 1225, which may be a table, text file, metadata file or any other file that may transmit the EDI 835 document's information. The EDI 835 document is stored within reports 1217 file and is transmitted to the eyewear provider at update insurance record 1213. Insurance service 1209 may parse through the EDI 835 document and collect information including reimbursement values, which is the monetary amount the eyewear provider may expect to receive from the insurance claim.

Figure 13:
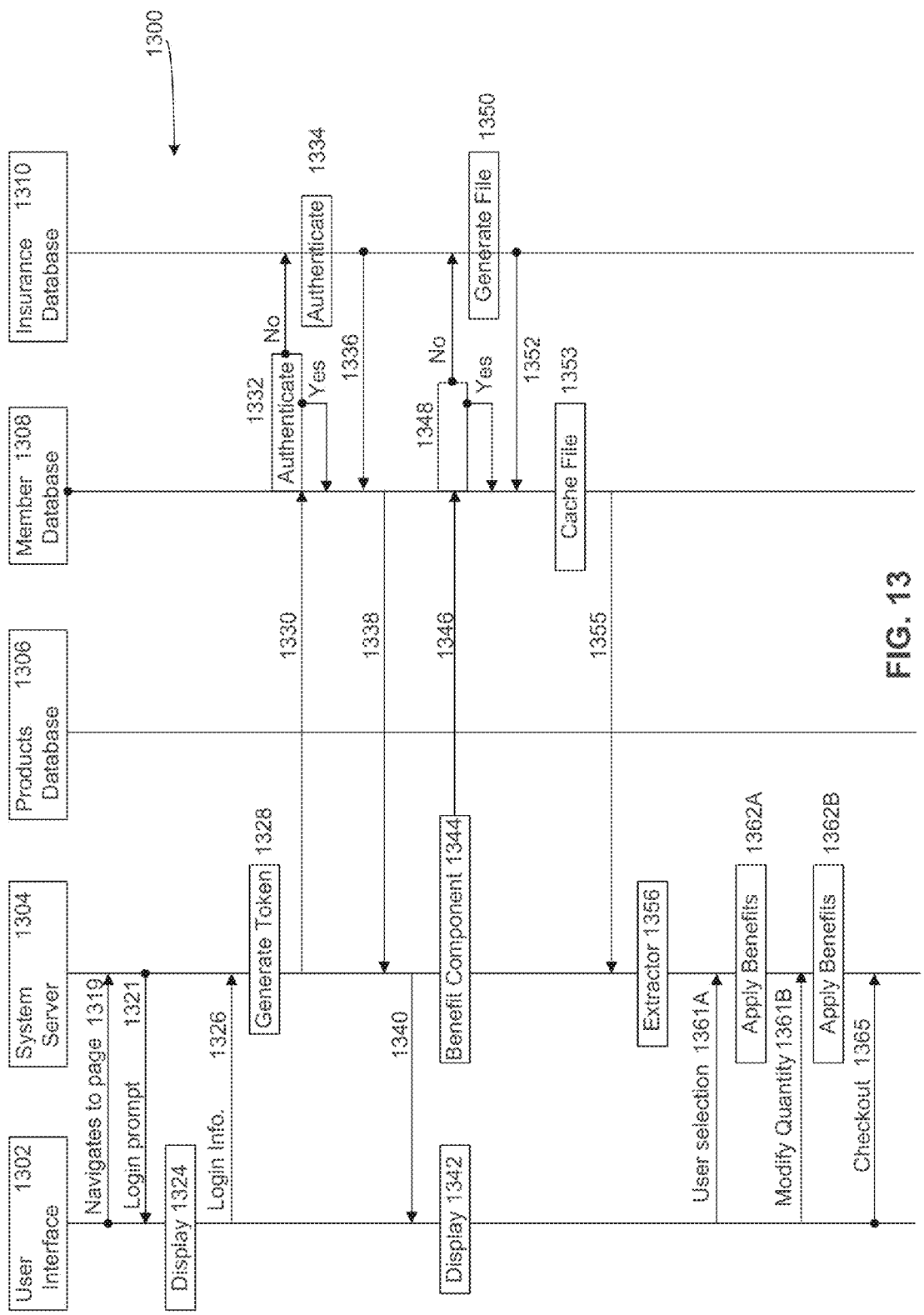
FIG. 13 is a sequence diagram illustrating a process for an online insurance benefit utilization system across multiple systems in order to utilize an initial insurance benefit for eyewear having a single price, according to an example embodiment.

Methods and systems discussed above have referred to products having multiple components, with each component (such as frames, lenses, coatings, etc.) having a different insurance benefit (or no benefit). However, other types of vision products do not have the level of complexity required for an eyeglasses purchase. For example, a contact lens product cannot be customized according to different specifications or options preferred by the user, because such specifications and options result in a different product altogether, with a different price. Online utilization of vision insurance benefits may be effected for such products so that the user experience is optimized to the complexity of the product. For example, FIG. 13 illustrates an initial insurance benefit utilization process 1300 for determining an available insurance benefit for a single priced product, according to an example embodiment. As contemplated herein, a single priced product is any stand-alone product that does not have additional accessories or options that may affect its cost or an available insurance benefit for that particular product. The cost of a single priced product may vary based on a number of factors, including quantity of product ordered. A single priced product may include, for example, a contact lens product. A contact lens product may be considered a single priced product because customized options such as coatings or tints cannot be added to a pre-existing, selected product, and thus the price of that particular product will not change due to customization.

The multiple systems/databases may include, for example, user interface 1302, system server 1304, products database 1306, members database 1308, and insurance database 1310. Like the processes described above, process 1300 may be performed by processing logic that may include hardware (e.g., circuitry, dedicated logic, programmable logic, microcode, etc.), software (e.g., instructions executable on the system server, at the user interface, or another processing device), or a combination thereof. It is not required that the steps depicted in FIG. 13 be performed in the exact order shown, as one skilled in the art would understand. In an embodiment, initial insurance benefit utilization process 1300 may be adjusted to enable updating information in any one of the databases associated with the user. Additionally, user interface 1302 may provide administrative privileges, not shown, wherein a system administrator may access, modify, create, or duplicate the data. A system administrator may also perform other administrative functions in the databases and with the data stored therein, as one skilled in the art would understand. As described above regarding process 200 and process 300 in FIGS. 2 and 3, respectively, process 1300 may further include an MA. In process 1300, the RIA may be implemented as a connectivity layer between user interface 1302 and system server 1304, products database 1306, member database 1308, and/or insurance database 1310, thereby facilitating data communications between the system components using the functionality described above.

In step 1319, a user initially navigates to and accesses a website associated with the insurance benefits utilization system. In response, the system server provides the user interface with a prompt for login information, as depicted by step 1321. At display 1324, the user interface may render and display the received information using a web application, a mobile application, or any other means whereby a user may interact with data through an electronic device.

To login, the user must provide a sufficient amount of personal information so the system may associate the user with his or her specific vision insurance plan. Accordingly, the system may prompt the user for personal information, including: first and last name, address, date of birth, zip code, portions of his or her social security number (SSN), insurance group identification, insurance member identification, password, and/or any other identifying personal identification. At step 1326 the user's login information is transmitted from the user interface to the system server.

Upon receiving the login information, the system server may generate a member token at step 1328, as described above with respect to step 228 of FIG. 2. At step 1330, the member token is passed from system server 1304 to member database 1308 in order to verify and authenticate the user's identity as an insurance member. This step may be complete using system call to a getEligibility( ) application program interface (API) provided at system server 204. APIs such as the getEligibility( ) API, a findMember( ) API, getMemberEligibility API and other similar APIs disclosed herein may be developed in order to provide developers an easier and more efficient method for interfacing with external databases and systems.

In steps 1332 and 1334, either member database 1308 or insurance database 1310 may verify and authenticate the user's member token. Steps 1336 and 1338 illustrate signals transmitted from the member and insurance databases to indicate that the member token is verified, i.e., that the user is an insured member. If, however, the user provided incorrect or insufficient identification information, the system may reattempt to authenticate the member token. Further, the signal passed in steps 1336 and 1338 will indicate a failed verification and authentication. The verification and authentication result is sent to the user interface at step 1304 and the result is rendered and displayed at step 1342. If the verification and authentication failed, the user may be provided with additional opportunities to correct or modify the entered login information at display 1342. Alternatively, display 1342 may prompt the user to call or otherwise contact his or her insurance provider to remedy any errors, inconsistencies, or any other deficiencies that may prevent the user from verifying and authenticating his or her insurance membership. In an additional embodiment, display 1342 may prompt the user to provide his or her insurance information in order to register an online account with the eyewear provider. In at least one embodiment, the system will not allow the user to access any insurance information or product and pricing information until his or her account has been verified and authenticated.

Also consistent with the present disclosure are embodiments where the member token and step 1328 are omitted. In such embodiments, a member ID may be passed directly to the insurance database in order to verify and authorize the user. This may occur, for example, when the provider is associated with the insurance company or has direct access to the insurance company database, rather than being a third party provider. Accordingly, any additional unnecessary steps, such as step 1332, may become optional as per the desired process and data schema.

Based on the verified and authenticated member token, the benefit component 1344 of system server 1304 may request member insurance benefit information from the member and insurance databases, respectively, as per step 1346. As shown in FIG. 13, and as described, the member insurance benefit information is requested from the respective databases in series. However, the request may alternatively be made in parallel. Further, the benefit component may request the member insurance benefit information exclusively from either the member database or the insurance database. Step 1346 may be carried out by making one or more real-time system calls to a getBenefits( ) API, a getClaimPricing( ) API, or another API created and configured to retrieved insurance benefit data and pricing from the insurance database.

Steps 1348 and 1350 retrieve and/or generate data, including the user's vision insurance benefit information. As mentioned above, the data may be generated and presented in one of several formats. For example, the data may be passed as an HTML table, an SQL table, a spreadsheet, a database table, a CSV file, a metadata file, or any other table or file commonly used to distribute categorized data.

At step 1353, member database 1308 may optionally retain or cache a copy of the file containing the user's benefit information, where the file is stored with the verified and authenticated member token. At step 1355, the benefits data is transmitted from member database 1308 to system server 1304. Upon receiving the benefits table, extractor 1356 parses the data and collects specific insurance benefit information. More specifically, the extractor collects the user's allowance amount, i.e., an amount that may be applied to any qualifying eyewear product or any other insurance benefit information specific to the member's insurance policy that may be necessary to determine and process an insurance claim. In additional embodiments, the system may provide a notification or a webpage where the user may see his or her benefit amount. For example, the user may request his or her benefit information and the system will return the user's allowance and/or discount amounts as detailed in his or her insurance benefit package. In an embodiment, such information is automatically provided to the user upon login.

At step 1361A, the user makes a product selection. Upon receiving the product selection, the system server may apply the benefits at step 1362A, or wait for the user to provide a desired quantity, as per step 1361B, before applying the benefits at step 1362B. The resulting updated product price may be transmitted to the user interface. The product price may then be rendered and displayed at the user interface. As mentioned above, the updated price may be rendered and displayed on a new webpage or application page in a position next to or near the initial product price, so the user may compare the initial and updated prices. Alternatively, a scripting language may be used to replace the initial price with the updated price without posting back the entire page. At step 1365, the user checks out or purchases the eyewear, and the eyewear provider fulfills the customer's eyewear order and begins preparing and filing the insurance benefit claim. In at least one embodiment, the system may determine whether the user has realized his or her full insurance benefit. If the user has not fully used his or her allowance, the system may generate a warning message to inform the user that he or she has a portion of his or her allowance remaining. Alternatively, if the user has fully used his or her allowance, such that insurance will not cover any or part of the selected product, the system may generate a warning message to that effect.

Figure 14:
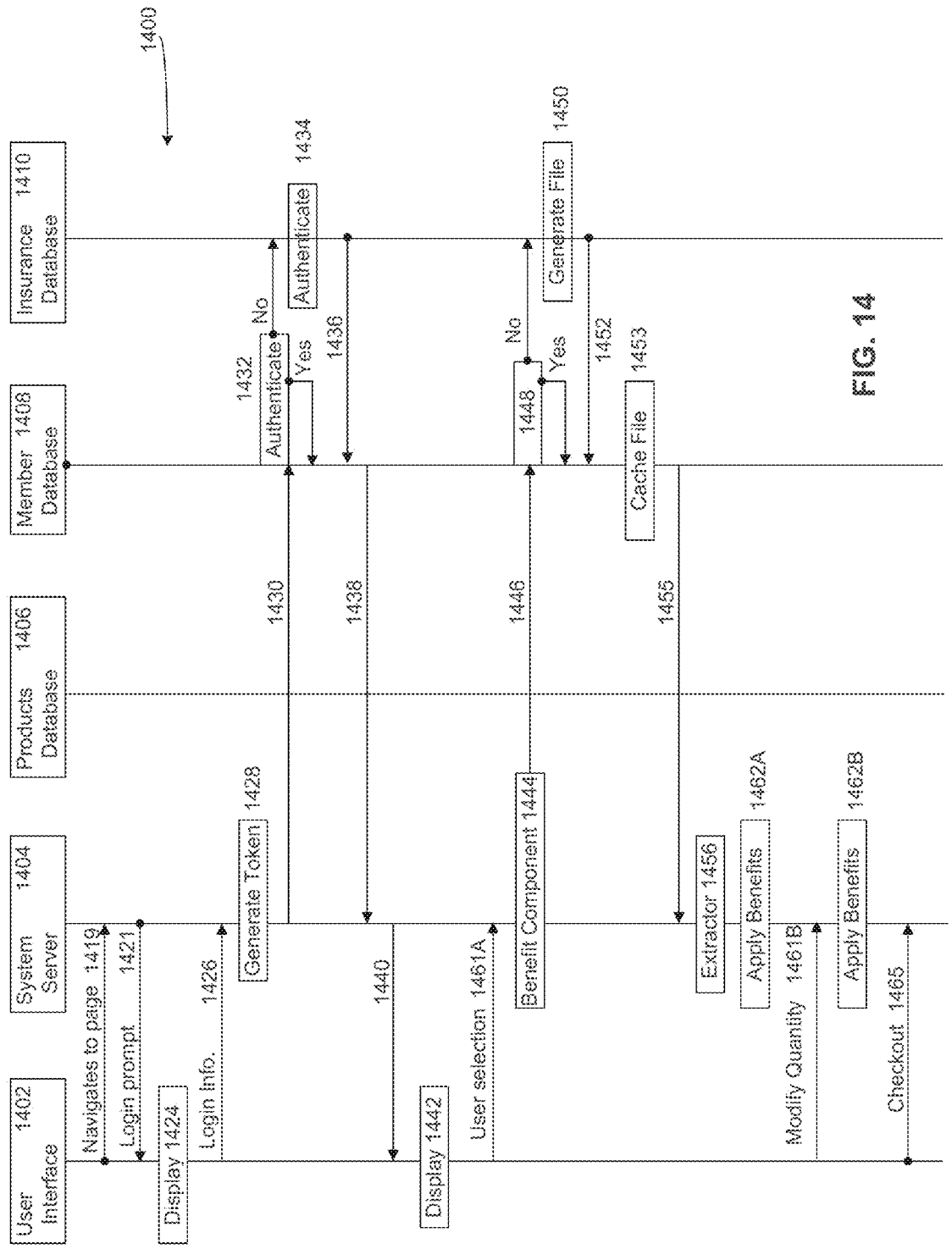
FIG. 14 is another sequence diagram illustrating a process for an online insurance benefit utilization system across multiple systems in order to utilize an initial insurance benefit for eyewear having a single price, according to an example embodiment.

FIG. 14 illustrates an initial insurance benefit utilization process 1400 for determining an available insurance benefit for a single priced product, according to an example embodiment. The multiple systems/databases may include user interface 1402, system server 1404, products database 1406, members database 1408, and insurance database 1410. Like the processes described above, process 1400 may be performed by processing logic that may include hardware (e.g., circuitry, dedicated logic, programmable logic, microcode, etc.), software (e.g., instructions executable on the system server, at the user interface, or another processing device), or a combination thereof. It is not required that the steps depicted in FIG. 14 be performed in the exact order shown, as one skilled in the art would understand. In an embodiment, initial insurance benefit utilization process 1400 may be adjusted to enable updating information in any one of the databases associated with the user. Additionally, user interface 1302 may provide administrative privileges, not shown, wherein a system administrator may access, modify, create, or duplicate the data. A system administrator may also perform other administrative functions in the databases and with the data stored therein, as one skilled in the art would understand. Process 1400 may further include an RIA. In process 1400, the RIA may be implemented as a connectivity layer between user interface 1402 and system server 1404, products database 1406, member database 1408, and/or or insurance database 1410, thereby facilitating data communications between the system components using the functionality described above.

In step 1419, a user initially navigates to and accesses a website associated with the insurance benefits utilization system. In response, the system server provides the user interface with a prompt for login information, as depicted by step 1421. At step 1424, the user interface may render and display the received information using a web application, a mobile application, or any other means whereby a user may interact with data through an electronic device.

To log in, the user must provide a sufficient amount of personal information so that the system may associate the user with his or her specific vision insurance plan, as described above. Accordingly, the system may verify and authenticate the user using a member token and by following the same, or similar, steps provided above. The results of the authentication and updated product pricing information may be rendered and displayed at the user interface at display 1442. Additionally at display 1442, the user may make a product selection.

In response to the user's product selection, the benefit component 1444 of system server 1404 may request member insurance benefit information from the member and insurance databases, as per step 1446, and as described above. Step 1446 may be carried out by making one or more real-time system calls to a getBenefits( ) API, a getClaimPricing( ) API, or another API created and configured to retrieved insurance benefit data and pricing from the insurance database. In an embodiment, such benefit information may be obtained when the user initially logs in instead of waiting for the product selection, if it is known or likely that the user will be selecting a single price product.

Steps 1448 and 1450 retrieve and/or generate data, including the user's vision insurance benefit information. As mentioned above, the data may be generated and presented in one of several formats. For example, the data may be passed as an HTML table, an SQL table, a spreadsheet, a database table, a CSV file, a metadata file, or any other table or file commonly used to distribute categorized data.

At step 1453, member database 1408 may optionally retain or cache a copy of the file containing the user's benefit information, where the file is stored with the verified and authenticated member token. At step 1455, the benefits data is transmitted from member database 1408 to system server 1404. Upon receiving the benefits table, extractor 1456 parses the data and collects specific insurance benefit information. More specifically, the extractor collects the user's allowance amount, i.e., an amount that may be applied to any qualifying eyewear product or any other insurance benefit information specific to the member's insurance policy that may be necessary to determine and process an insurance claim. The system server may apply the benefits at step 1362A, or wait for the user to provide a desired quantity, as per step 1361B, before applying the benefits at step 1362B.

An updated product price may be calculated at steps 1462A and 1462B by subtracting the user's allowance from the original retail price of a selected product. Any additional discounts may also be subtracted from the original retail price. The remaining amount is an out-of-pocket price, or the price that the user will have to pay for the product after the user's vision insurance benefits have been applied. This out-of-pocket price is the updated product price. The updated product price for each product may be transmitted to the user interface where they may be rendered and displayed at the user interface. As mentioned above, the updated price may be rendered and displayed on a new webpage or application page in a position next to or near the initial product price, so the user may compare the initial and updated prices. Alternatively, a scripting language may be used to replace the initial price with the updated price without posting back the entire page. At step 1465, the user may checkout or purchase the eyewear and the eyewear provider may fulfill the customer's eyewear order and begin preparing and filing the insurance benefit claim.

Figure 15:
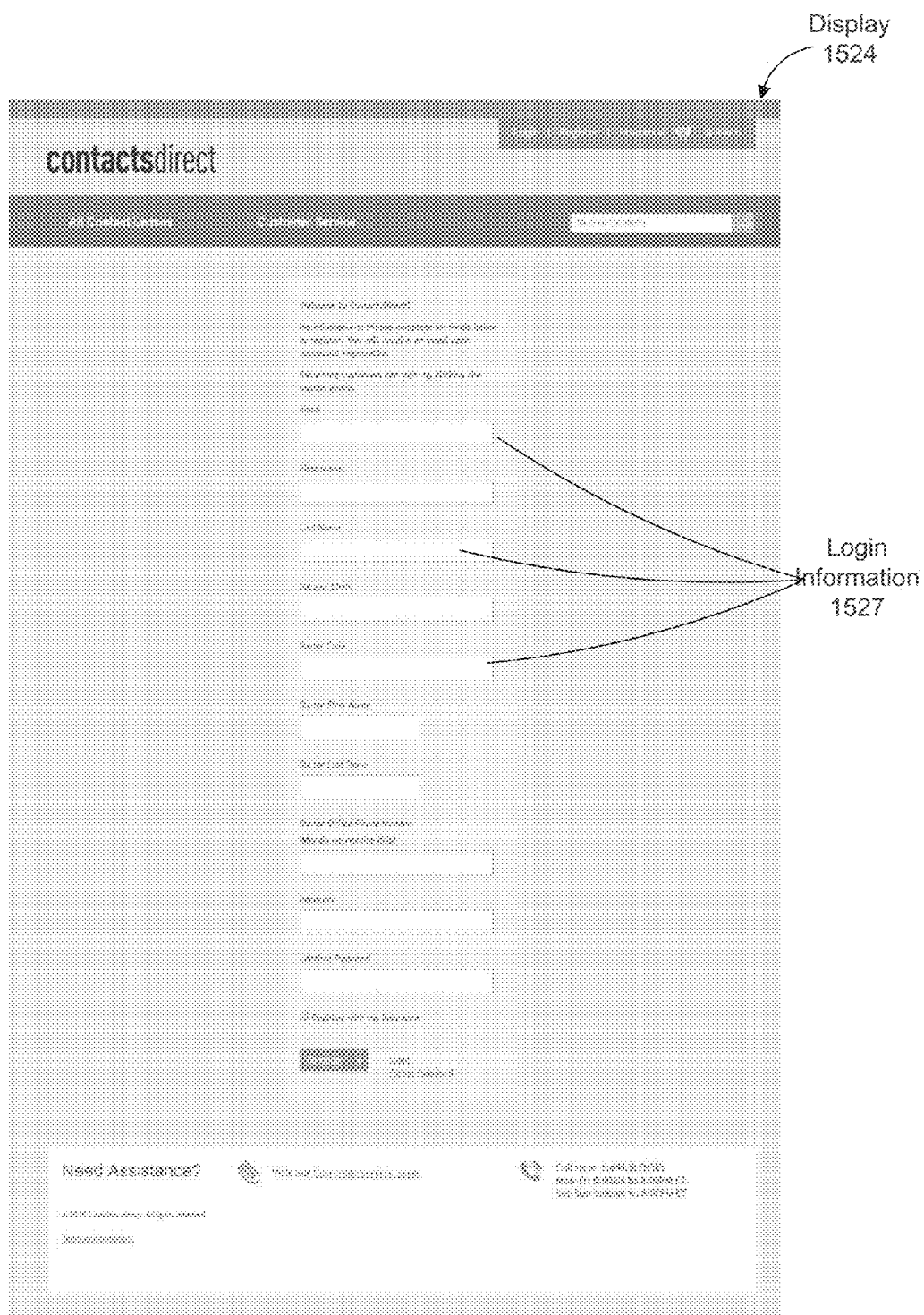
FIGS. 15-18 illustrate example implementations of webpages for an insurance benefit utilization system, according to example embodiments.

FIG. 15 illustrates an example implementation and display 1524 of a webpage for an insurance benefit utilization system. More specifically, FIG. 15 provides an example of a login page where the user is prompted to provide the requisite login information 1527 so that the system server may generate a member token and begin the verification and authentication process described above.

Figure 16:
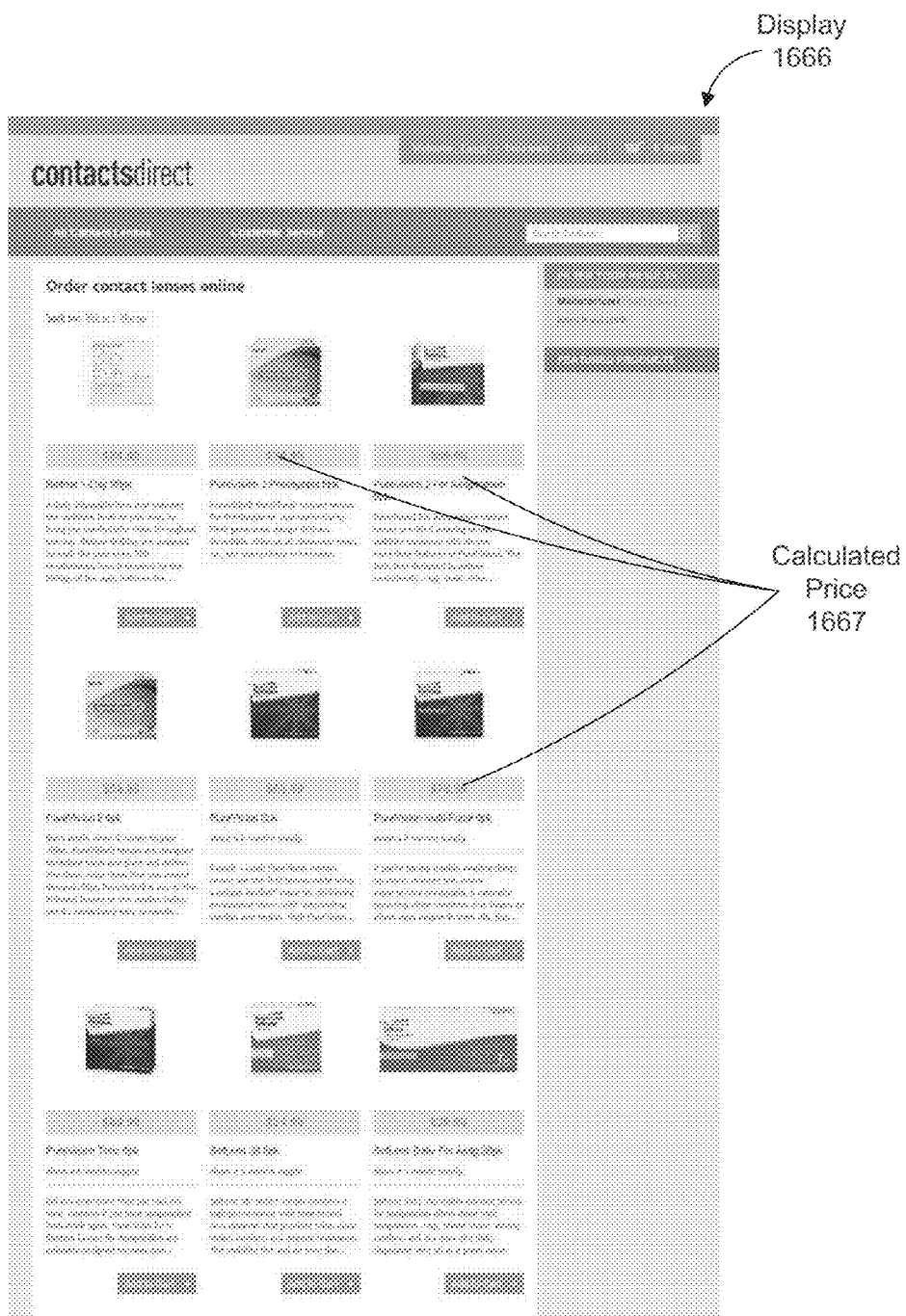

FIG. 16 illustrates example implementation and display 1666 of a webpage providing the product price 1667A, determined by applying a user's insurance benefit information to the original regular price of single-priced eyewear. In some embodiments, since the user's insurance policy allowance has been provided to him or her upon login, the user can determine the out-of-pocket price based on the displayed product price. In additional embodiments, display 1666 may provide a calculated out-of-pocket price in addition to, or in place of, product price 1667A.

Figure 17:
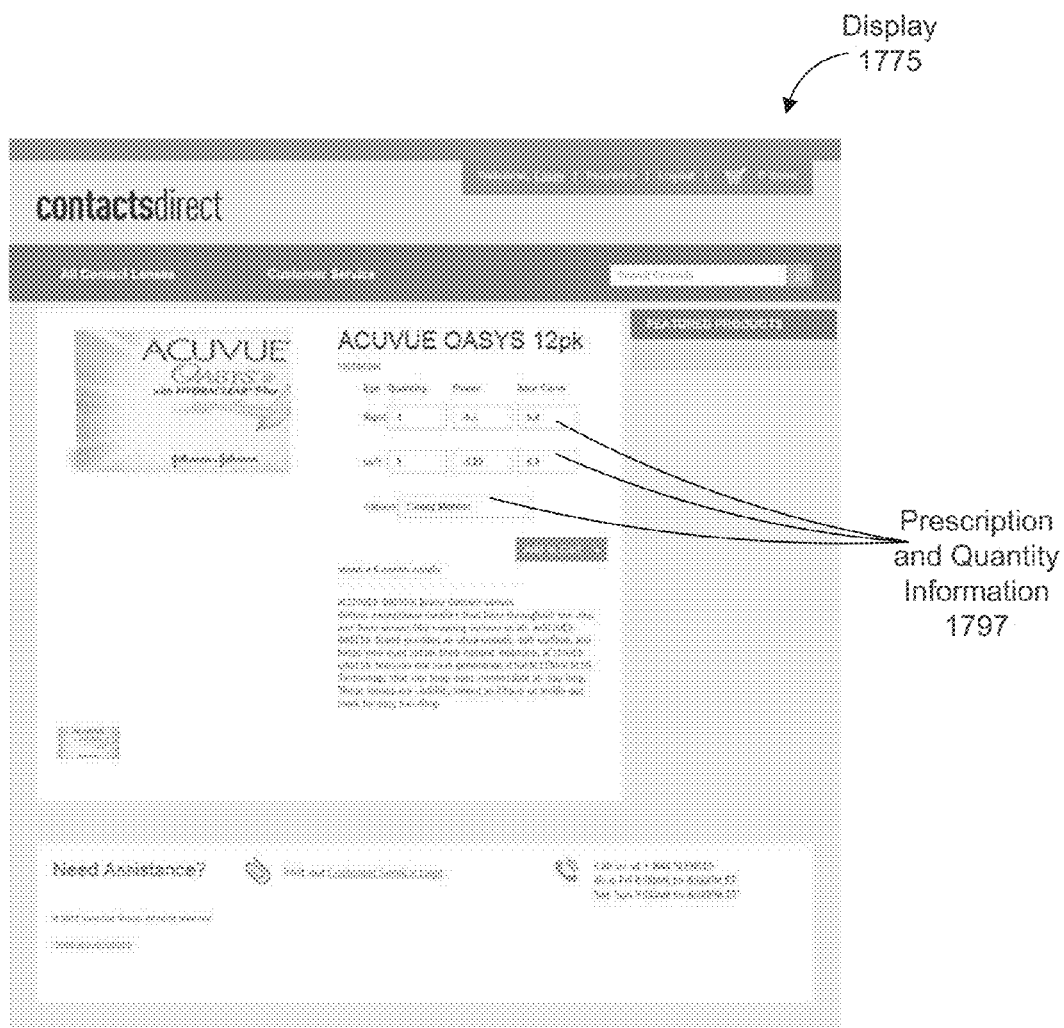

FIG. 17 illustrates an example implementation and display 1775 of a webpage providing a product display page. As shown, the page includes text boxes 1797, where the user may enter his or her prescription information as well as the desired quantity of eyewear products.

Figure 18:
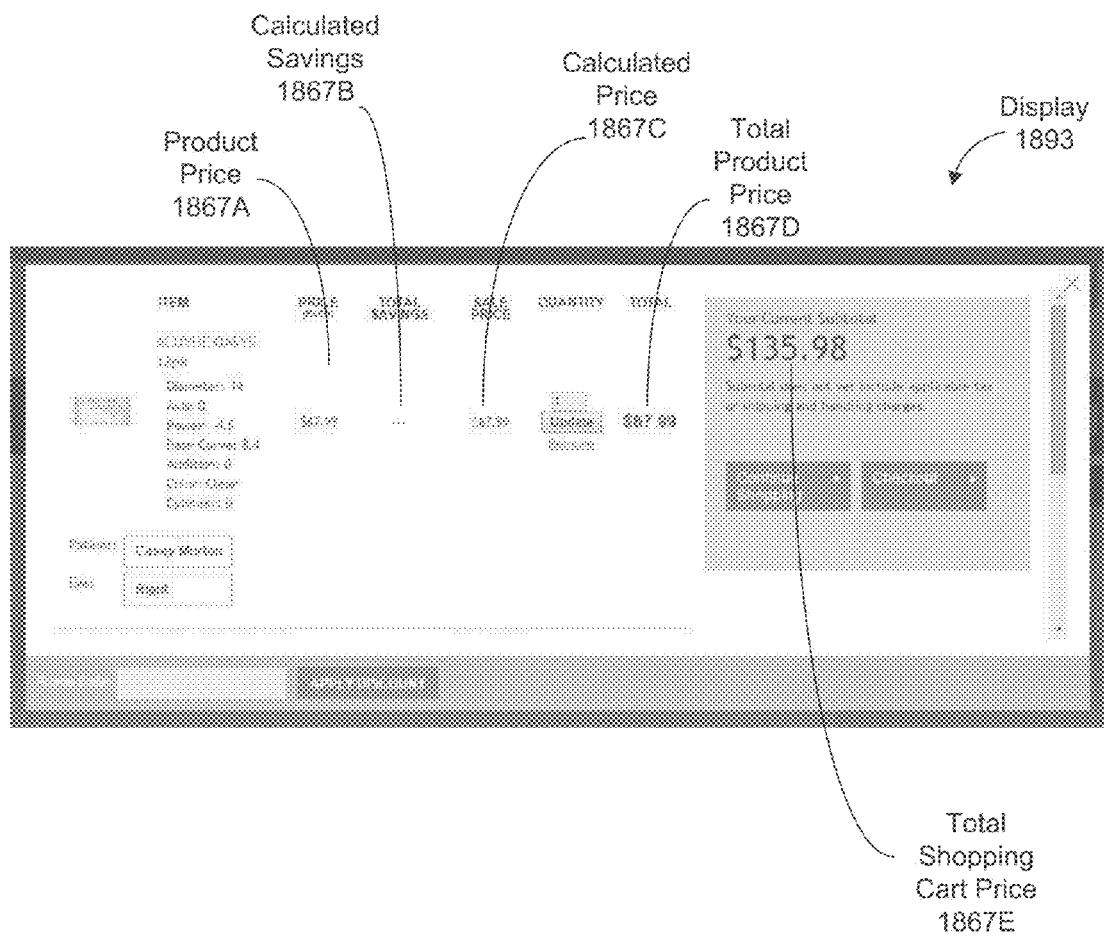

FIG. 18 illustrates an example implementation and display 1893 of a webpage providing a summary of the user-selected product. As shown, the user is provided with initial product price 1867A, calculated savings 1867B, calculated price 1867C for the selected product, and total product price 1867D based on the user-determined quantity. Calculated price 1867C is determined by extracting the required information from the user's insurance benefit information, as mentioned above with respect to steps 1356 and 1456 in FIGS. 13 and 14, respectively. Calculated savings 1867B may be calculated by subtracting calculated product price 1867C from product price 1867A, the result being the difference between the two prices. Total product price 1867D may be calculated by multiplying calculated price 1867C by the quantity provided by the user. Additionally shown is total shopping cart price 1867E, which is calculated by adding the total product price for each item in the user's shopping cart. As shown, FIG. 18 also prompts the user for any applicable discount codes and allows the user to either continue shopping for more eyewear products or begin the checkout process.

Currently, there are a number of e-commerce websites that offer eyewear, some of which may offer incentives or promotions to entice users to buy from its e-commerce platform. The disclosed insurance benefit utilization system may also offer incentives and/or promotions such as clearance items, buy one get one free, discounted items, discounted brands, or sales wherein the product price becomes a fraction of its regular price. Accordingly, the disclosed system may provide a method for users to apply his or her insurance benefits toward a promotional item. Alternatively, the system may block a user from applying his or her insurance benefits toward a promotional item or sale. In yet another embodiment, the system may provide a method wherein the user may compare a promotional price against an estimated out-of-pocket price after his or her insurance benefit has been applied to the original retail price of the eyewear product, thereby enhancing the user's buying experience. For example, if an eyewear provider is offering a 10% off sale on all OAKLEY brand glasses, the system may provide the user with both the reduced promotional price (10% off) and the estimated price after the insurance benefit has applied, so the user can determine whether to use his or her insurance benefits, or take advantage of the promotion. Further, the system may parse a user's insurance benefit information and compare the available benefits with the eyewear provider's inventory, calculate the most economical options, and thereby recommend products that would provide the lowest out-of-pocket price to the user.

The disclosed insurance benefit utilization system may further comprise a reporting layer, whereby financial analysts may track and reconcile claim payouts against both the original insurance pricing quotes as well as information provided within the filed claim documents. The reconciliation may then be facilitated between the eyewear provider and the insurance provider through traditional email or phone channels.

It is contemplated herein that the disclosed insurance benefit utilization system may be provided to webhosts, doctors, ophthalmologists, opticians, or any other third party eyewear provider, as a white label product or service. As such, the third party eyewear provider may "rebrand" the disclosed insurance benefit utilization system to make it appear as if it were the third party eyewear provider's own system.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the present disclosure should not be limited by any of the above-described exemplary embodiments, but should be defined only in accordance with the following claims and their equivalents.

What is claimed is:

1. A system, comprising:
   a products database configured to store eyewear product and pricing information for a plurality of eyewear products; and
   a benefit utilization processing system, implemented by a system server coupled to an insurance database and the product database, the insurance database configured to store insurance benefit information associated with a user, wherein the insurance benefit information includes at least one of an allowance amount and a discount amount, the benefit utilization processing system comprising:
      an interface configured to display the eyewear product and pricing information collected from the products database and to receive at least one of a user insurance policy number and a user insurance group identification number, wherein a user token is created for the user;
      a products service component configured to retrieve the eyewear product and pricing information from the products database for at least one eyewear product and cause the eyewear product and pricing information to be displayed on the interface;
      a benefit component configured to pass the user token to the insurance database and receive a benefits table containing insurance benefit details associated with the user;
      a benefit extractor component, configured to parse the received benefits table and extract benefit information associated with the user;
      an options selection component, configured to retrieve in batch form pricing information for a plurality of alternative eyewear options from the insurance database, wherein the eyewear options are compatible with a selected product, and the compatible options are provided for selection at the interface; and
      a benefit calculation component, configured to:
         apply the extracted benefit information associated with the user to the eyewear product and pricing information to determine individual benefit amounts for each selected product and each selected option,
         determine a final benefit amount based on the determined individual benefit amounts by subtracting the determined individual benefit amounts from the original eyewear product and pricing information, and
         cause the final benefit amount to be displayed on the interface.

2. The system of claim 1, wherein the options selection component is further configured to store the retrieved pricing information for the plurality of alternative options as a quote in a local memory at the system server.

3. The system of claim 1, further comprising a pre-processing mapping component, configured to normalize the eyewear product and pricing information.

4. The system of claim 3, wherein the pre-processing mapping component is further configured to map the normalized product information to data stored in the insurance database.

5. The system of claim 1, further comprising a retail integration adapter disposed between the interface and at least one of the products service component, the benefit component, the benefit extractor component, and the options selection component.

6. A web interface for an insurance integrated eyewear environment, comprising:
   a logic parser configured to receive a logic description from insurance integrated eyewear environment, parse the logic description, and generate a web browser readable eyewear data file;
   at least one web page configured to display information in the eyewear data file, including an eyewear product price, and prompt for user inputs in response thereto, wherein the user inputs include personal information that associates the patient with a vision insurance plan; and
   a call scripting process configured to:
      receive the user inputs entered on the at least one web page,
      obtain vision insurance data associated with the user based on the received user inputs from an insurance database, wherein the insurance data comprises at least one of an allowance amount and a discount amount,
      extract insurance benefits associated with the user from the obtained vision insurance data;
      provide a plurality of alternative eyewear options compatible with a user selected eyewear product,
      retrieve pricing information for the plurality of alternative eyewear options from the insurance database in batch form, and
      communicate the user inputs and extracted insurance benefits to the eyewear environment in order to effect a change in the eyewear product price, wherein the change in the eyewear product price is calculated by subtracting user specific benefit amounts from the eyewear product price.

7. The web interface of claim 6, wherein the change in the eyewear product price is effected in real-time.

8. The web interface of claim 6, wherein the call scripting process is further configured to normalize the eyewear product and pricing information.

9. The web interface of claim 8, wherein the call scripting process is further configured to map the normalized product information to data stored within the insurance database.

10. A method, comprising:
   receiving, by an interface implemented on a system server coupled to an insurance database and a product database, at least one of a user insurance policy number and a user insurance group identification number, wherein:
      a user token is created for the user,
      the insurance database stores information including at least one of an allowance amount and a discount amount associated with the user, and
      the product database stores eyewear product and pricing information for a plurality of eyewear products;
   displaying, at the interface, eyewear product and pricing information for at least one eyewear product, wherein the product and pricing information is obtained from the products database;
   obtaining, from the insurance database, a benefits table containing insurance benefit details associated with the user;
   extracting, at the system server, benefit information associated with the user from the benefits table including at least one of an allowance amount and a discount amount;
   providing, at the interface, a plurality of alternative eyewear options compatible with a user selected eyewear product;
   retrieving, at the system server, pricing information for the plurality of alternative eyewear options from the insurance database in batch form; and
   displaying, at the interface, an updated product price, wherein the updated product price is calculated by subtracting the user's benefit information from the eyewear product and pricing information.

11. The method of claim 10, wherein the plurality of eyewear products comprises at least one of eyeglasses, frames, contact lenses, sunglasses, safety glasses, or goggles.

12. The method of claim 10, wherein the plurality of alternative eyewear options comprises at least one of: lens type, lens shape, lens material, lens coating, or lens transitions.

13. The method of claim 10, wherein displaying an updated product price occurs in real-time.

14. The method of claim 10; wherein at least one of receiving, obtaining, extracting, providing, and retrieving are performed using encrypted data.

15. The method of claim 10, wherein the system server is further configured to store the retrieved pricing information for the plurality of alternative eyewear options as a quote in a local memory.

16. The method of claim 10, further comprising normalizing, at the system server, the eyewear product and pricing information.

17. The method of claim 16; further comprising mapping the normalized product information to data stored within the insurance database.

18. An online benefit utilization method for a single-priced product, comprising:
   receiving, by an interface implemented on a system server coupled to an insurance database and a product database, at least one of a user insurance policy number and a user insurance group identification number,
      wherein the insurance database stores information including at least one of an allowance amount and a discount amount, and
      wherein the product database stores eyewear product and pricing information for a plurality of eyewear products;
   obtaining, from the insurance database, a benefits table containing insurance benefit details associated with the user;
   extracting, at the system server, benefit information associated with the user from the benefits table;
   displaying, at the interface, initial eyewear product and pricing information for at least one eyewear product, wherein the initial product and pricing information is obtained from the products database;
   receiving a product selection from a user; and
   displaying, at the interface, an updated product price based upon a user's product selection, wherein the updated product price is calculated by subtracting the extracted benefit information from the initial eyewear product and pricing.

19. The method of claim 18, wherein the single-priced product comprises at least one contact lens.

20. The method of claim 18, further comprising prior to the displaying initial eyewear product and pricing information:
   displaying, at the interface, information indicative of the benefit information associated with the user.

21. The method of claim 18, further comprising:
   receiving, from the product database, a promotional price associated with the product selection;

displaying, at the interface, both the promotional price and the updated product price;

receiving, from the interface, a user selection of either the product selection at the promotional price or the product selection at the updated product price; and applying, at the system server, the price associated with the user selection.

* * * * *